US011881928B2

(12) United States Patent
Gineste et al.

(10) Patent No.: US 11,881,928 B2
(45) Date of Patent: Jan. 23, 2024

(54) SPACE COMMUNICATION METHOD FOR IOT SERVICES AND CORRESPONDING SPACE TELECOMMUNICATIONS SYSTEM

(71) Applicant: THALES, Courbevoie (FR)

(72) Inventors: Mathieu Gineste, Toulouse (FR); David Niddam, Toulouse (FR); Nicolas Chuberre, Toulouse (FR)

(73) Assignee: THALES, Courbevoie (FR)

( * ) Notice: Subject to any disclaimer, the term of this patent is extended or adjusted under 35 U.S.C. 154(b) by 861 days.

(21) Appl. No.: 16/500,778

(22) PCT Filed: Mar. 27, 2018

(86) PCT No.: PCT/EP2018/057698
§ 371 (c)(1),
(2) Date: Oct. 3, 2019

(87) PCT Pub. No.: WO2018/184900
PCT Pub. Date: Oct. 11, 2018

(65) Prior Publication Data
US 2022/0278742 A1    Sep. 1, 2022

(30) Foreign Application Priority Data

Apr. 4, 2017  (FR) ...................................... 1700359

(51) Int. Cl.
*H04B 7/185*   (2006.01)
*H04B 7/195*   (2006.01)
*H04W 74/08*   (2009.01)

(52) U.S. Cl.
CPC ....... *H04B 7/1858* (2013.01); *H04B 7/18504* (2013.01); *H04B 7/18517* (2013.01); *H04B 7/195* (2013.01); *H04W 74/0833* (2013.01)

(58) Field of Classification Search
CPC ............ H04B 7/18504; H04B 7/18517; H04B 7/1858; H04B 7/195; H04W 74/0833
See application file for complete search history.

(56) References Cited

U.S. PATENT DOCUMENTS 6,757,546 B1 *  6/2004  Hagen ................ H04B 7/18504
                                                      370/320
8,169,955 B2 *  5/2012  Ansari ............... H04B 7/18513
                                                      370/316

(Continued)

FOREIGN PATENT DOCUMENTS

CN        1115010 C      7/2003
CN      101674648 A      3/2010

(Continued)

OTHER PUBLICATIONS

Chinese Office Action issued in Chinese Patent Application No. 2018800371008.8 dated Apr. 25, 2021, with English Translation.

*Primary Examiner* — Alpus Hsu
(74) *Attorney, Agent, or Firm* — BakerHostetler

(57) ABSTRACT

A method of space communication for IoT or equivalent services increases the number of terminals served on a space transmission resource while limiting the signaling used by the terminal. This limitation is obtained on the one hand by the allotting to each terminal of a logical beam, corresponding to a predetermined fixed geographical area wherein the terminal lies. This limitation is obtained on the other hand by management, centralized at the level of a central entity for connecting to the space network, of the association of the terminal with a logical beam and of the association of the resources bound for the logical attachment beam. A space telecommunications system implements a method of space communication. The method of space communication allows transparent switchover from a terrestrial system to the space system when the terrestrial system and the space (Continued)

system are integrated to a high degree, particularly at the level of the terminal.

25 Claims, 12 Drawing Sheets

(56) References Cited

U.S. PATENT DOCUMENTS

| | | | |
|---|---|---|---|
| 8,780,000 B2 * | 7/2014 | Palacin | H01Q 25/007 343/778 |
| 9,363,712 B2 * | 6/2016 | Chuberre | H04B 7/18513 |
| 9,748,989 B1 * | 8/2017 | Freedman | H04B 7/2041 |
| 9,924,424 B2 * | 3/2018 | Chuberre | H04W 28/04 |
| 2010/0128656 A1 | 5/2010 | Kim et al. | |
| 2013/0009809 A1 * | 1/2013 | Bert | H04B 7/2041 342/354 |
| 2015/0063201 A1 | 3/2015 | Kim et al. | |
| 2017/0181160 A1 * | 6/2017 | Corbel | H04B 17/336 |
| 2017/0311178 A1 * | 10/2017 | Feria | H04B 7/18504 |
| 2018/0241464 A1 * | 8/2018 | Michaels | H04W 56/0045 |

FOREIGN PATENT DOCUMENTS

| | | |
|---|---|---|
| CN | 102440010 A | 5/2012 |
| CN | 103929232 A | 7/2014 |
| CN | 105471487 A | 4/2016 |
| EP | 1 075 737 A1 | 2/2001 |
| EP | 3 209 088 A1 | 8/2017 |
| FR | 2 939 004 A1 | 5/2010 |
| WO | 99/57821 A1 | 11/1999 |
| WO | 01/65726 A1 | 9/2001 |

\* cited by examiner

SPACE COMMUNICATION METHOD FOR IOT SERVICES AND CORRESPONDING SPACE TELECOMMUNICATIONS SYSTEM

CROSS-REFERENCE TO RELATED APPLICATIONS

This application is a National Stage of International patent application PCT/EP2018/057698, filed on Mar. 27, 2018, which claims priority to foreign French patent application No. FR 1700359, filed on Apr. 4, 2017, the disclosures of which are incorporated by reference in their entirety.

FIELD OF THE INVENTION

The present invention relates to a method of communication for IoT services and to a space telecommunications system with high capacity in terms of number of user terminals served, which is able to be integrated if relevant into a radiocommunications system with ordered hierarchical cellular coverage.

The present invention also relates to a method of switchover of a communication of a terminal between a terrestrial cellular network and a space cellular network.

The present invention also relates to a user terminal in which a space mode of connection and at least one cellular terrestrial mode are integrated in a flexible manner at the level of the physical layer.

The present invention also relates to an access module for accessing the space mobile network of the integrated radiocommunications system, said access module being integrated at the level of a space relay or of a gateway ground station for connecting to the fixed terrestrial infrastructure.

The technical field of the invention relates to the implementation of low-bitrate communications by a space system including a very large number of terminals according to a sporadic traffic profile.

BACKGROUND

Here and subsequently, a "space" system refers to a satellite system using as relay(s) one or more satellites deploying in a geostationary orbit GSO or in non-geostationary orbits NGSO such as low orbits LEO (Low Earth Orbit) or intermediate circular orbits MEO (Medium Earth Orbit), or a so-called "HAPS" ("High Altitude Platform Station") system using as relay(s) at least one high-altitude platform station.

The satellite or HAPS space system is optionally integrated into an integrated radiocommunications system with ordered hierarchical cellular coverage, such as for example the integrated radiocommunications system, described in the French patent application of N. Chuberre et al., entitled "Système intégré de radiocommunications à couverture cellulaire hiérarchique ordonnée" [Integrated radiocommunications system with ordered hierarchical cellular coverage] and filed on 7 Apr. 2016 under the filing number No. 1600304.

One of the issues with the infrastructure of 5G, that is to say fifth-generation, mobile networks is to increase the service coverage and to increase the transmission resource with respect to that of 2G, 3G or 4G mobile networks so as to be able to address applications which require continuity of service over global coverage, and optionally high reliability over said coverage.

In particular, featuring among these applications are communications between machines M2M ("Machine to Machine") in the following fields:
transport, for the remote tracking and control of merchandise conveyed by sea, air and/or land;
safety with the monitoring of so-called critical infrastructures such as water or energy distribution networks and also emergency communications;
connected automotive; and
agriculture for in particular the management of livestock.

For the most part, these applications are characterized by a low messaging-type service bitrate, and generate sporadic and highly asymmetric traffic, with a bandwidth on the service return pathway, that is to say from the terminal, using the service, to the service platform, that is much greater than that of the service outbound pathway, that is to say from the service platform to the service user terminal. However, these applications may require an outbound pathway for reasons of management and control of the terminals and of control of access to the resource.

The issue is therefore to offer ubiquity of service at lesser cost and the fastest infrastructure deployment time for the radiocommunications network or networks.

Current satellite-based mobile networks are known to offer global service coverage, very suitable for addressing areas of low population density as well as maritime areas. The combining of satellite and terrestrial mobile networks is therefore the natural solution for providing telecommunication systems which guarantee continuity of service and high availability at an optimized investment and operational cost of the network infrastructure.

However, the current telecommunications systems thus formed exhibit strong limitations in terms of number of terminals that can be served in parallel. For very sporadic traffic, the implementation of complex and voluminous signaling such as exists in these telecommunications systems, for example in phases of entry to the satellite network ("logon") or of traffic switchover ("handover"), does not allow a scaling which would meet the needs of a very sizable number of terminals expected in M2M/IoT ("Machine to Machine/Internet of Things") networks, of the order of a million or indeed more.

Furthermore, the current integration of the two mobile networks, satellite and terrestrial, is carried out by the design and the use of dual-mode handheld terminals capable at one and the same time of operating
with the satellite mobile network and the terrestrial cellular network as do for example the dual-mode handheld terminals capable of operating with the GSM ("Global System for Mobile") or indeed UMTS ("Universal Mobile Telecommunications System") terrestrial cellular systems and the Thuraya satellite-based mobile system; and
with the complementary satellite and terrestrial components of one and the same satellite mobile system, dubbed "Ancillary Terrestrial Component", as do for example the dual-mode terminals designed for integrated satellite and terrestrial systems such as "TerreStar" and "Lightsquared".

In both cases, this leads to the production of terminals that are specifically suited to the market for satellite mobile systems and integrating a dual transmission/reception chain, each chain being based on a radio interface, optimized for the respective characteristics of the satellite and cellular systems in terms of radioelectric propagation conditions.

However, the size of the satellite mobile market, estimated at a few million units of terminals, being relatively restricted with regard to the terrestrial mobile market, estimated at a few billion units of terminals, does not spur the makers of satellite mobile terminals to diversify their range of products, or to seek to reduce their costs and/or their sizes or their bulk.

It should be noted that certain attempts have been made to reuse in the context of a satellite mobile network a radio interface initially designed for a mobile terrestrial cellular system. However, the characteristics and the low degree of flexibility which are offered by 2G (GSM), 3G (WCDMA) or 4G (LTE) radio interfaces have led to sub-optimization of performance in the context of the satellite-based mobile network.

Furthermore, operation in the frequency bands allocated to the satellite mobile network, that is to say the MSS (Mobile Satellite Service) frequency band, requires that the terminal be supplemented with an additional specific RF radiofrequency stage.

Generally, the known current dual-mode or multiple-mode solutions making it possible with a dedicated terminal to communicate alternatively across at least one terrestrial cellular network and the satellite network involve the addition of specific hardware constituents for satellite-based communication including for example an antenna and/or a radiocommunication chain and/or additional processing capabilities.

These known solutions are satisfactory for addressing the current satellite market but do not allow wide-scale use of very low bitrate satellite-based terminals.

Consequently, a first general technical problem is to provide a space telecommunications system for IoT services which is able to be integrated into a radiocommunications system with ordered hierarchical cellular coverage, and a corresponding method for implementing the radiocommunications, for which a larger number of terminals than that of current space telecommunications systems can use a limited satellite resource by taking into account the fact that the terminals each have very sporadic and potentially bidirectional and asymmetric communication with more significant traffic on the up-path, the fact that the traffic is non-uniform per area, very dense areas dubbed "hot-spots" possibly existing, that the position of the terminals is a priori unknown before the establishment of a communication, and the fact that the hardware used by the terminal may be the same or very similar for satellite access and for terrestrial access.

A second technical problem, connected with the first technical problem, is to provide radiocommunications terminals having a very low bitrate and sporadic communication profile, whose hardware and software architecture allows said terminals to access in very large number a space system on a limited satellite resource for services having very sporadic traffic, typically M2M/IoT services, and therefore to ensure continuity of service with the terrestrial networks; and optionally to ensure continuity of service in the guise of terrestrial cellular terminals for low bitrate communications relating to services such as messaging, voice, etc., initiated in a terrestrial or satellite cellular network, said terminals using in this case the hardware resources of a terminal which is developed to operate in terrestrial cellular networks or equivalent, without any extra hardware related to satellite communication.

SUMMARY OF THE INVENTION

To this effect, the subject of the invention is a method of space communication implemented by a multibeam space telecommunications system, the multibeam space telecommunications system comprising a multibeam space relay taken from among a satellite and a high-altitude relay HAPS platform, and a ground station GW, serving as interconnection gateway between a fixed terrestrial infrastructure and the space relay, and an access module (enodeB) for accessing the space network formed by the space relay and the ground station, said access module being embedded on board the space relay when the space relay is regenerative or embedded in the ground station GW when the space relay is transparent or distributed between the space relay and the ground station GW, and at least one user terminal, the method of space communication being characterized in that it comprises the following steps:

in a first step, the user terminal emits at a given instant T on a random uplink UL data channel and in a predetermined span of frequencies to the space network access module one or more bursts of data, including an identifier and, when the terminal is able to determine its geo-location or to aid its geo-location, explicit or implicit information regarding the geographical location of said terminal; and then in a second step, the space network access module receives and decodes the burst or bursts of data emitted by the terminal, and associates with the terminal a logical beam on the basis of said terminal's location information provided in the first step when the terminal is able to determine or to aid its geo-location or derived from the received signal carrying the burst or bursts of data emitted when the terminal is not able to determine or to aid its geo-location, the associated logical beam being a predetermined fixed geographical area, in which the terminal lies at the given instant T and which belongs to a tiling of the geographical coverage of the space system into a set of distinct geographical areas which are devoid of mutual overlap and each of which forms a different logical beam, and then in a third step, the space network access module dispatches to the terminal, through a broadcasting beacon whose carrier frequency the terminal already knows, an identifier of a downlink DL data channel carrier allocated to the terminal and to its associated logical beam, so as to allow the terminal to receive and decode useful and control data which are intended for it.

According to particular embodiments, the method of space communication comprises one or more of the following characteristics:

the first step comprises a first phase of entry to the satellite network with emission of one or more bursts of signaling data on the random channel and a second phase of transmitting one or more bursts of data on a random access using the random channel or a deterministic access;

in the third step, a down-channel DL unique carrier is allocated by the space network access module to the logical beam in which the terminal lies.

the method of space communication furthermore comprises the following steps: in a fourth step, executed after the third step, the terminal performs the acquisition of the carrier of the downlink DL data channel according to the carrier frequency identifier which was transmitted to it and starts listening for possible bursts transmitted on this DL carrier which are possibly intended for it; and then, in a fifth step, the space network access module dispatches to the terminal through the downlink DL data channel, at the carrier frequency of the logical beam with which the terminal is associated, one or more bursts of useful data and/or of control data of the terminal and/or of data for signaling a new carrier, associated with the logical beam of attachment of the terminal, said dispatching being performed on one or more physical emission beams of the space relay which at the given instant T overlap the entirety of and are associated with the logical beam of the terminal;

the control data relate to the implementation of some or all of the following mechanisms: a mechanism of contention access control on the random uplink UL channel, including congestion control and stream control and taking into account the specifics of a satellite-based or HAPS station-based communication channel, with selection of timeouts and selection of a mode of transmission as a function of the type of data to be transmitted; a specific power control mechanism suited to the uplink UL communication channel; a Doppler drifts control mechanism; an economizer mechanism for saving electrical energy of the terminal based on the provision of a temporal duty cycle information item representative of a temporal sharing of one and the same downlink DL data channel carrier frequency by several logical beams served by one and the same satellite;

the control data relating to the implementation of the economizer mechanism for saving electrical energy of the terminal are signaled in a specific header DCH containing the following two items of information: a next downgoing frequency "next frequency burst DL" that the terminal must listen for, referenced to a known index or frequency channel number or a relative frequency value with respect to a current frequency; and a next start instant "next start burst DL" from which the terminal must listen, the next start instant indicating the start instant of the next downgoing DL burst and being able to be expressed as a multiple number of bursts from the end of the current burst listened to;

the method of space communication furthermore comprising a sixth step, executed after the fifth step, and in which the terminal dispatches to the space network access module on the random uplink UL communication channel at the carrier frequency fDL signaled in the third step or in the fifth step one or more bursts of data as well as information relating to the location of said terminal at a new instant T+1, the method of space communication comprises a prior step previous to the first step in which the access module broadcasts to the at least terminal which lie in the global geographical coverage of the space relay and on a broadcasting beacon whose carrier frequency the at least one terminal already knows, on the one hand the frequency plan of the space system containing a list of identifiers and of respectively associated frequencies of the carriers of uplinks and of downlinks, and on the other hand information for aiding the location of the terminal or terminals;

the logical beam is a simple, compact geographical area in one piece, or the logical beam is a finite discrete set of compact elementary geographical areas in one piece, distributed according to spacing distances between neighboring areas that are predetermined, preferably in a cluster or several clusters;

the shape of a geographical area, simple or elementary, is polygonal, preferably square or rectangular or lozenge or triangular or hexagonal, or circular or elliptical;

the logical beam is an integer number of compact elementary geographical areas in one piece, distributed in an isotropic and homogeneous manner, the integer number of elementary geographical areas preferably being between 2 and 25;

the multibeam space radiocommunications system is configured to be integrated into an integrated telecommunications system, the integrated telecommunications system comprising in addition to the space system at least one, mobile and cellular, terrestrial system, the terrestrial system comprising, integrated into one or two terrestrial ground stations, a cellular terrestrial RF relay and an interconnection gateway between the terrestrial RF relay and the common fixed terrestrial infrastructure, shared with the space system; and an access module (enodeB) for accessing the terrestrial system, formed by the terrestrial RF relay and the station or the two stations, said access module being included in the terrestrial station or one of the two stations, and at least one user space terminal of the dual-mode or multi-mode space system configured to communicate in the space system and/or the terrestrial system, the method of space communication comprising the following steps executed before the first step:

in a prior step, the access module broadcasts to the at least one terminal which lie in the global geographical coverage of the relay the frequency plan of the space system containing a list of identifiers and of respectively associated frequencies of the carriers of uplinks and of downlinks; and then in a scan launch and execution step, the broadcasting beacons of the terrestrial system and/or of the space system are scanned according to a predetermined scanning algorithm, and an indication of a mode of new connection, taken from among connection to the "terrestrial" system and to the "space" system, and to be selected is provided, this indication being dependent on the respective availabilities of the terrestrial system and the space system and a selection strategy based on priorities of a system from among the terrestrial system and the space system, and then in a validation step, the indication of the mode of connection to be selected is validated; thereafter in a step of selecting the communication system, when the "terrestrial" mode is selected the terminal is connected to the terrestrial system, and when the "satellite" mode is selected the terminal is connected to the satellite system by executing the set of the first and second steps or the set of the first, second, third, fourth and fifth steps;

the method of space communication described hereinabove comprises a step of switching the hardware and software configuration of the terminal from a mode suited to the channels of the uplinks downlinks of the terrestrial system to a mode suited to the channels of the uplinks and downlinks of the space system, the switching step being interposed between the step of selecting the communication system and the first step, and being performed by applying new PHY/MAC layer parameters and new specific algorithms of the space channels without changing RF chain and waveform;

the method of space communication described hereinabove comprises a step of control of the maintaining of the space communication, activated periodically according to a timeout of predetermined duration, in the course of which the broadcasting beacons of the terrestrial system and/or of the space system are scanned according to the predetermined scanning algorithm, and an indication of a mode of new connection, taken from among connection to the "terrestrial" system and to the "space" system, and to be selected is provided, this indication being dependent on the respective availabilities of the terrestrial system and the space system and the selection strategy based on priorities of a system from among the terrestrial system and the space system, and when the indication provided is the space mode the communication is maintained on the space mobile network;

when the indication provided of the mode of the new connection is the terrestrial mode, a switching of the communication on the terrestrial mobile network is performed without interrupting said communication;

the strategy for selecting the mode of a new connection is based on the priority of the terrestrial mode of connection with respect to the space mode of connection.

The subject of the invention is also a space telecommunications system comprising: a multibeam space relay taken from among a satellite and a high-altitude relay HAPS platform; and a ground station GW, serving as interconnection gateway between a fixed terrestrial infrastructure and the space relay; and an access module (enodeB) for accessing the space network formed by the space relay and the ground station, said access module being embedded on board the space relay when the space relay is regenerative or embedded in the ground station GW when the space relay is transparent; and at least one user space terminal; the space telecommunications system being characterized in that: the terminal is configured to, in a first step, emit at a given instant T on a random uplink UL data channel and in a predetermined span of frequencies to the space network access module one or more bursts of data, including an identifier and, when the terminal is able to determine or to aid its geo-location, explicit or implicit information regarding the geographical location of said terminal; and the space network access module is configured to: in a second step subsequent to the first step, receive and decode the burst or bursts of data emitted by the terminal, and associate with the terminal a logical beam on the basis of said terminal's location information provided in the first step when the terminal is able to determine or to aid its geo-location or derived from the received signal carrying the burst or bursts of data emitted when the terminal is not able to determine or to aid its geo-location, the associated logical beam being a predetermined fixed geographical area, in which the terminal lies at the given instant T and which belongs to a tiling of the geographical coverage of the space system into a set of distinct geographical areas which are devoid of mutual overlap and each of which forms a different logical beam; and then in a third step, dispatch to the terminal, through a broadcasting beacon whose carrier frequency the terminal already knows, an identifier of a downlink DL data channel carrier allocated to the terminal and to its associated logical beam, so as to allow the terminal to receive and decode useful and control data which are intended for it.

According to particular embodiments, the telecommunications system comprises one or more of the following characteristics:

the space network access module is configured to, in the third step, allocate a down-channel DL unique carrier to the logical beam in which the terminal lies, and/or the terminal is configured to, in a fourth step executed after the third step, perform the acquisition of the carrier of the downlink DL data channel according to the carrier frequency identifier which was transmitted to it and start listening for possible bursts transmitted on this DL carrier which are possibly intended for it; and then the space network access module is configured to, in a fifth step subsequent to the fourth step, dispatch to the terminal through the downlink DL data channel, at the carrier frequency of the logical beam with which the terminal is associated, one or more bursts of useful data and/or of control data of the terminal and/or of data for signaling a new carrier, associated with the logical beam of attachment of the terminal, said dispatching being performed on one or more physical emission beams of the space relay which at the given instant T overlap the entirety of and are associated with the logical beam of the terminal;

the control data relate to the implementation of some or all of the following mechanisms: a mechanism of contention access control on the random uplink UL channel, including congestion control and stream control and taking into account the specifics of a satellite-based or HAPS station-based communication channel, with selection of timeouts and selection of a mode of transmission as a function of the type of data to be transmitted; a specific power control mechanism suited to the uplink UL communication channel; a Doppler drifts control mechanism; an economizer mechanism for saving electrical energy of the terminal based on the provision of a temporal duty cycle information item representative of a temporal sharing of one and the same downlink DL data channel carrier frequency by several logical beams served by one and the same satellite;

the terminal is configured to, in a sixth step executed after the fifth step, dispatch to the space network access module on the random uplink UL communication channel at the carrier frequency fDL signaled in the third step or in the fifth step one or more bursts of data as well as information relating to the location of said terminal at a new instant T+1; and/or the space network access module is configured to, in a prior step previous to the first step, broadcast to the at least one terminal which lie in the global geographical coverage of the space relay and on a broadcasting beacon whose carrier frequency the at least one terminal already knows, on the one hand the frequency plan of the space system containing a list of identifiers and of respectively associated frequencies of the carriers of uplinks and of downlinks, and optionally information for aiding the location of the terminal or terminals;

the logical beam is a simple, compact geographical area in one piece, or the logical beam is a finite discrete set of compact elementary geographical areas in one piece, distributed according to spacing distances between neighboring areas that are predetermined, preferably in a cluster or several clusters;

the space system is a multibeam satellite system comprising a satellite or a constellation of several satellites, the satellite or satellites deploying in geostationary orbits GSO or low orbits LEO or orbits of MEO type.

The subject of the invention is also an integrated telecommunications system comprising: the multibeam space system defined hereinabove, and at least one, mobile and cellular, terrestrial system; the terrestrial system comprising:

integrated into one or two terrestrial ground stations, a cellular terrestrial RF relay and an interconnection gateway between the terrestrial RF relay and the common fixed terrestrial infrastructure, shared with the space system; and an access module for accessing the terrestrial system, formed by the space relay and the station or the two stations, said access module being included in the terrestrial station or one of the two stations, and at least one user space terminal of the space system, configured dual-mode or multi-mode to communicate in the space system and/or the terrestrial system;

the integrated telecommunications system being characterized in that:

the space network access module is configured to, in a prior step, broadcast to the at least one terminal which lie in the global geographical coverage of the space relay on the one hand the frequency plan of the space system containing a list of identifiers and of respectively associated frequencies of the carriers of uplinks and of downlinks; and the terminal is configured to in a scan launch and execution step executed after the prior step, scan the broadcasting beacons of the terrestrial system and/or of the space system according to a predetermined scanning algorithm, and provide an indication of a mode of new connection, taken from among connection to the "terrestrial" system and to the "space" system, and to be selected, this indication being dependent on the respective availabilities of the terrestrial system and the space system and a selection strategy based on priorities of a system from among the terrestrial system and the space system, and then in a validation step, validate the indication of the mode of connection to be selected; thereafter in a step of selecting the communication system, connect to the terrestrial system when the "terrestrial" mode is selected, and connect to the satellite system when the "satellite" mode is selected, by executing the set of the first and second steps defined hereinabove or the set of the first, second, third, fourth and fifth steps defined hereinabove.

The subject of the invention is also a dual-mode or multi-mode telecommunications user terminal comprising: a first RF radiofrequency circuit, including an antenna and multi-band RF components, a second digital circuit of ASIC/FPGA type for processing a physical layer of a multiple radio access, and a third digital microcontroller circuit and digital signal processor for processing a physical layer and higher layers of terrestrial mobile networks, the terminal being characterized in that the first radiofrequency circuit and the two digital circuits are configured to allow software configuration of RF parameters and of an access and connection protocol which are specific to the space mobile network, the software configuration being carried out by the implementation of all or some of a set of software modules comprising:

a software module for selecting the cellular or mixed, satellite mode of operation, this module being based on a mechanism for detecting the availability of the services and resources of a terrestrial cellular system and/or of the satellite mobile system and in general favoring the use of a terrestrial cellular system;

a software module for parametrizing the software radio according to operation in the bands allocated to the space mobile service;

a software module for selecting the bandwidth or the number of emission/reception carriers which is suited to the satellite channel;

a module for implementing a specific contention access algorithm according to the invention, in particular on the up-path with the selection of the timeouts and of the mode of transmission as a function of the type of information to be transmitted and which is suited to the satellite-based communication channel;

a module for implementing a specific power control algorithm suited to the satellite-based communication channel;

a module for implementing a specific Doppler compensation mechanism suited to the satellite-based communication channel.

According to particular embodiments, the telecommunications terminal comprises one or more of the following characteristics:

the first, second and third circuits (254, 256, 258) are configured to:

emit at a given instant T on a random uplink UL data channel at a predetermined frequency to the space network access module one or more bursts of data, including an identifier and information regarding the geographical location of said terminal;

perform the acquisition of a carrier of a downlink DL data channel according to a carrier frequency identifier which was transmitted to the terminal by the space network central access module and start listening for possible bursts transmitted on this DL carrier which are possibly intended for it;

dispatch to the space network central access module on the random uplink UL communication channel at a carrier frequency fDL signaled in an earlier step one or more bursts of data as well as information relating to the location of said terminal at a new instant T+1.

The subject of the invention is also an access module for accessing a space system, integrated into a space relay or into a ground station GW serving as gateway between the space system and a fixed terrestrial infrastructure, characterized in that it is configured to:

decode one or more bursts of data emitted by a terminal, and associate with the terminal a logical beam on the basis of information provided beforehand regarding the location of said terminal, the associated logical beam being a predetermined fixed geographical area, in which the terminal lies at a given instant T and which belongs to a tiling of the geographical coverage of the space system into a set of distinct geographical areas which are devoid of mutual overlap and each of which forms a different logical beam, and then dispatch to the terminal, through a broadcasting beacon whose carrier frequency the terminal already knows, an identifier of a unique carrier of a downlink DL data channel, which carrier is allocated to the terminal and to its associated logical beam, so as to allow the terminal to receive and decode useful and control data which are intended for it.

According to particular embodiments, the access module comprises one or more of the following characteristics:

the space network access module is configured to dispatch to the terminal through the downlink DL data channel, at the carrier frequency of the logical beam with which the terminal is associated, one or more bursts of useful data and/or of control data of the terminal and/or of data for signaling a new carrier, associated with the logical beam of attachment of the terminal, said dispatching being performed on one or more physical emission beams of the space relay which at the given instant T overlap the entirety of and are associated with the logical beam of the terminal.

BRIEF DESCRIPTION OF THE DRAWINGS

The invention will be better understood on reading the following description, given only by way of example, of several embodiments, while referring to the drawings in which.

DETAILED DESCRIPTION

Figure 1:
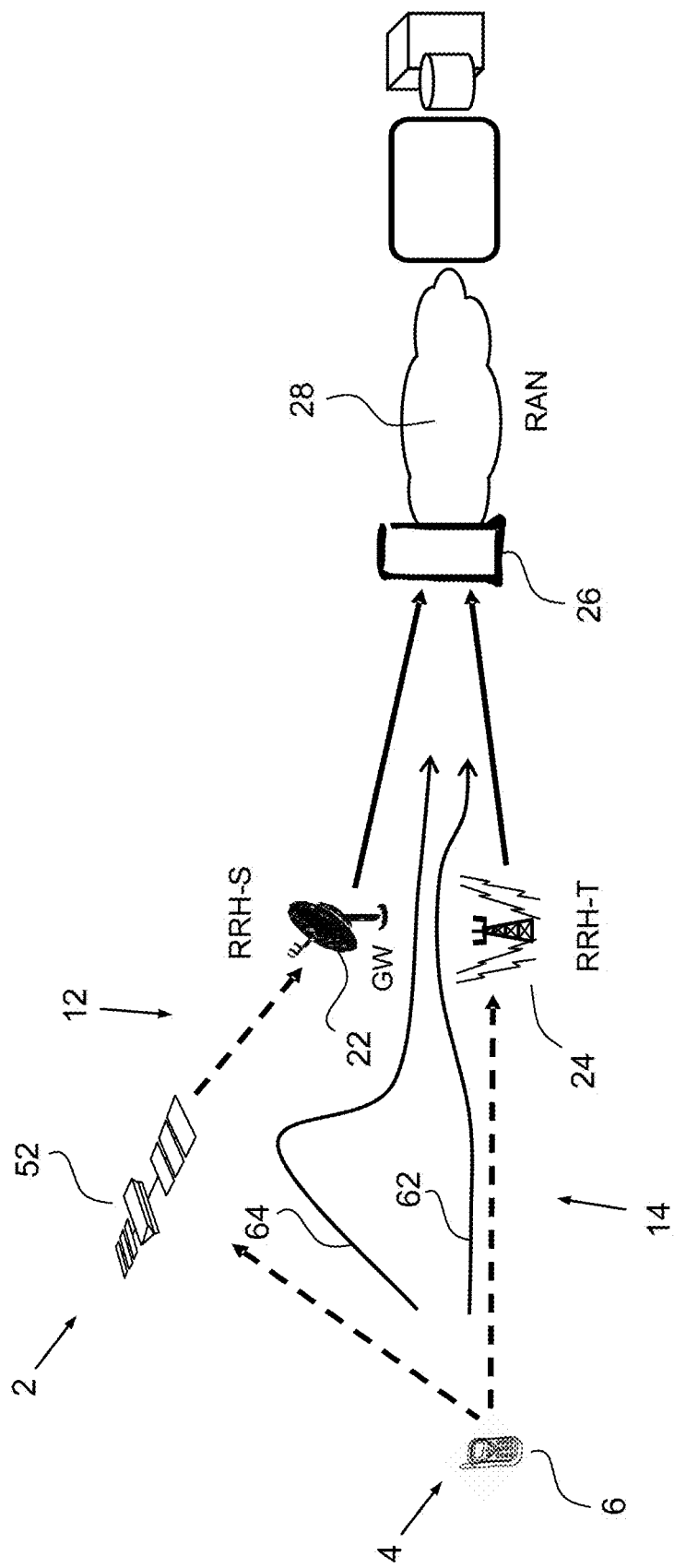
FIG. 1 is a schematic view of a first embodiment of a space radiocommunications system according to the invention, integrated into an exemplary radiocommunications system with ordered hierarchical cellular coverage.

According to a first aspect of the invention which is aimed at increasing the number of terminals served on a given resource of the space system, a first subjacent concept of the invention is to very considerably limit the signaling, used and managed conventionally by terminals having sustained traffic but also by those having sporadic traffic of low bitrate, such as for example the traffic of satellite-based M2M/SCADA (Supervisory Control and Data Acquisitions) applications, and to implement resources management which is entirely centralized at the level of the access station GW by appreciably limiting the signaling, emitted from and received by the terminal, and by basing this on the bursts or salvos of data, emitted by the terminal on the return pathway from the terminal to the access station GW, and on a small amount of signaling information to manage the following phases, which consume a great deal of signaling in conventional systems:

- the management of switchover of a communication between a terrestrial network and a space network (dubbed "handover") or of entry into the space system carried out with signaling in the band (in-band) allocated to the uplink UL of the satellite system, the registration of the terminal being carried out in a terrestrial cellular network of the integrated system or in the space network;
- the management of user-transparent and signaling-free switchovers between physical beams (inter-beams handover) of one and the same satellite;
- the management of switchovers between physical beams of two different satellites (reference will then be made to a switchover between satellites, dubbed inter-satellite handover).

To implement the first concept described hereinabove, a second subjacent concept of the invention is to associate user terminals with "logical beams" with each burst of data emitted by the terminals, the logical beams being defined by a mesh of fixed geographical areas which, without ever overlapping even partially, form the global coverage of the space system. Each logical beam is characterized by a different geographical area and is associated in real time with a plurality of physical beams of the space relay (satellite or HAPS platform) which overlap said logical beam.

The logical beams make it possible to avoid any management of switchover (or "handover") of communication for the terminal and of associated signaling. The association of a terminal with a logical beam and the association of the transmission resources bound for this logical beam are managed at the level of the access station of the space network or of a centralized unit of higher level of the infrastructure of an integrated system, while being based on the data messages transmitted by the terminal. Thus the terminal can be reached at any instant, thereby making it possible to transmit control information or data to it, in particular for stream and congestion control, so as to improve performance and avoid collapse of access to the satellite system.

An uplink UL unique frequency band BUL, composed of a set of carrier frequencies, is used in the space system so as not to have to undertake any specific terminal-based allocation.

A downlink frequency fDL is used per space relay for a set of terminals situated in the same logical beam so as to transmit control information or data to them without physical beam switchover.

An appreciable reduction in the cost of signaling (or "overhead") is thus obtained which is independent of the protocol level in which the signaling is included, this being worthwhile in the case of sporadic traffic for which the share of the signaling is very significant, more significant than the share of the traffic itself. Consequently, the number of terminals that can use a given transmission resource of the space system will be greatly increased.

According to a second aspect of the invention which is aimed in a 5G context at increasing the integration of the space mobile service (satellite- or HAPS station-based) with the "terrestrial" or "cellular" mobile service without impacting the hardware constituents of new-generation terminals, a third subjacent concept of the invention is to configure in a software manner the RF parameters of the hardware platform of the terminal and also the protocol of the radio interface, for example the NB-IoT, or Narrow Band Internet of Things, protocol undergoing standardization at the 3GPP to allow satellite-based operation.

Indeed the 5G context offers this opportunity for increased integration of the mobile service by space relay with the "terrestrial" or "cellular" mobile service without impacting the hardware constituents of new-generation terminals, by virtue of the following facts:

- on the one hand the current design and current development of radio interface(s) offering characteristics compatible with the link budgets of a mobile satellite network, in particular the possibility of configuring the bandwidth of the channels, especially the possibility of reducing it on the up-path to a few kilohertz, which will also be allowed by the transport protocol on account of a standardization of narrowband access applicable for the transmission of IoT services (NB-IoT),
- on the other hand, a large proportion of cellular terminals will in the near future be fitted with a software radio stage allowing them to operate in the multiple bands allocated to the mobile service, for example in the frequency range 900 to 2500 MHz.

According to FIG. 1 and a first embodiment, an integrated telecommunications system 2 comprises a set 4 of multimode user terminals 6 according to the invention which are compatible with one or more terrestrial cellular and assimilated systems, and with a space system according to the invention, a multibeam satellite space system 12 according to the invention, and a terrestrial cellular system 14. Here, to simplify FIG. 1, a single user terminal 6 is represented.

In the two components, space and terrestrial cellular, 12, 14 of the integrated system 2, the known architecture of the base stations, dubbed "e-Node B", and of the radio access network RAN ("Radio Access Radio") controllers is modified.

The radio stage and the antenna system of each of the base stations are henceforth associated with functions of digital conversion in an entity generically dubbed a Remote Radio Head RRH and more specifically RRH-S 22 for the satellite component 12 and RRH-T 24 for the terrestrial cellular component 14 represented.

Each remote radio head RRH 22, 24 is hooked up to the modem functions, that is to say demodulation, decoding, coding, and modulation, grouped together at the level of an entity 26 of control of the Cloud radio access network 28, referred to as "Cloud" RAN or C-RAN, capable of processing the signals of several RRHs distributed over a coverage area. Such an architecture allows maximum use to be made of diversity techniques or MIMO ("Multiple Input Multiple Output") techniques to optimize the spectral efficiency, the quality of service QoS and the capacity of the network. Furthermore the C-RANs can exchange information between themselves so as to combine RF radiofrequency signals collected by various remote radio heads RRHs which are adjacent or immediately nearby but situated at the boundary between two areas, controlled by distinct C-RANs.

The integrated system 2 is configured to provide, in particular, unidirectional low-bitrate communications services for applications of inter-machine communication type with terminals with a very high degree of autonomy.

The space component or the space system 12, considered to be a first system of the integrated system, is configured to operate in the same frequency bands as the cellular networks, considered to be second systems, for example in the UHF, L, S or extended C band, without creating interference or jamming on the terrestrial cellular network or networks. The satellite system 12 constitutes a component of the integrated system 2 which allows an extension of the coverage of the terrestrial cellular networks or systems.

The space system 12, based here on for example non-stationary NGSO satellites 52, is configured to receive the signals transmitted by the cellular terminals 6 in a given area and to retransmit them to the C-RANs in the same format as that used by the terrestrial RRHs.

Typically, the space system 12 according to the invention is configured through its satellites to generate a set of beams whose footprint constitutes a set of spatial or satellite cells.

The signals transmitted by all the terminals situated in a satellite cell are therefore collected by a satellite 52 of the satellite system 12 and retransmitted by broadcasting to the set of satellite remote radio heads RRH-S 22 distributed in this satellite cell. The C-RAN 32 or the C-RANs attached to the terrestrial RRHs (RRH-T) 24 and to the satellite RRHs (RRH-S) 22 of the satellite cell are configured to combine the signals collected through the diverse terrestrial RRHs as well as those collected by satellite through the at least one satellite RRH while taking account of the difference in lags between two paths 62, 64 for conveying the signals to the C-RAN 208, a first path 62 traveling through a terrestrial RRH-T 24 and a second path 64 traveling through a satellite RRH-S 22.

In a satellite cell having a high density of terrestrial remote radio heads RRH-T, the contribution added by the satellite component is small since in this case the C-RAN has at its disposal numerous terrestrial components via the RRH-Ts of a signal transmitted by a cellular terminal. However, in case of overload of the terrestrial components, the contribution afforded by the satellite component through its umbrella coverage appears very useful.

In a satellite cell having a low density of terrestrial remote radio heads RRH-T, for example in a rural area, the satellite component makes it possible to seamlessly supplement the coverage of one or more terrestrial cellular components.

In a satellite cell that does not have any remote radio head, either satellite or terrestrial, at its disposal, for example in an isolated desert or maritime area, the satellite component is the single means of collecting the signals transmitted by the cellular terminals. It will be relayed by several inter-satellite links ISL up to a satellite remote radio head RRH-S situated in another satellite cell.

The satellite remote radio head RRH-S 22 of the space system 12 according to the invention integrates in addition to an e-NodeB modem (4G/5G) specific access mechanisms which make it possible to optimize the reception of the messages transmitted on the satellite communication channel.

Here, the satellite remote radio head RRH-S 22 is integrated into the ground, that is to say a gateway GW, the satellite 52 being assumed transparent.

As a variant, the satellite 52 is regenerative and the satellite remote radio head RRH-S is integrated on board the satellite.

As a variant, the space system is not integrated into a radiocommunications system with ordered hierarchical cellular coverage and constitutes an autonomous telecommunications system which comprises one or more satellite remote radio heads integrating in addition to a modem for hooking up to the terrestrial infrastructure specific access mechanisms making it possible to optimize the reception of the messages transmitted on the satellite communication channel.

Figure 2:
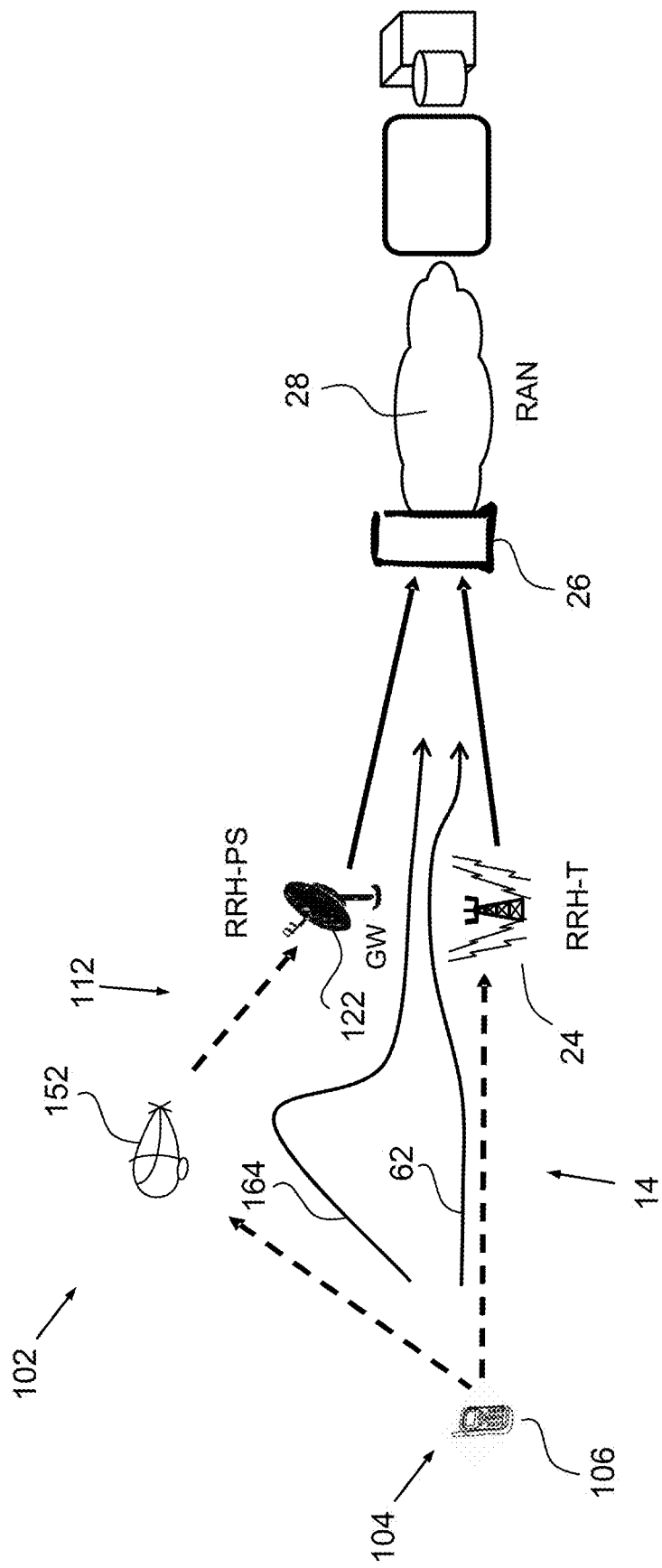
FIG. 2 is a schematic view of a second embodiment of a space radiocommunications system according to the invention, here integrated into an exemplary radiocommunications system with ordered hierarchical cellular coverage.

According to FIG. 2 and a second embodiment, an integrated telecommunications system 102 comprises elements identical to those of the integrated telecommunications system 2 of FIG. 1, bearing the numerical references 14, 24, 26, 28.

The integrated system 102 differs from the integrated system 2 of FIG. 1 in that the multibeam satellite space system 12 and the satellite radio head RRH-S 22 are respectively replaced with a multibeam HAPS space system 112 using as relay platform(s) at least one high-altitude platform station HAPS platform 152 and a remote radio head HAPS-HRPS 122, suited to the links between a user terminal and a HAPS platform.

Furthermore, the integrated system 102 is different in that it comprises a set 104 of multi-mode terminals having a high degree of integration and which are capable of managing the interface with a space mobile network of HAPS type.

Here, the path of signals traveling via the High Altitude Platform HAPS platform 152 up to the C-RAN 208 is designated by the numerical reference 26.

Figure 3:
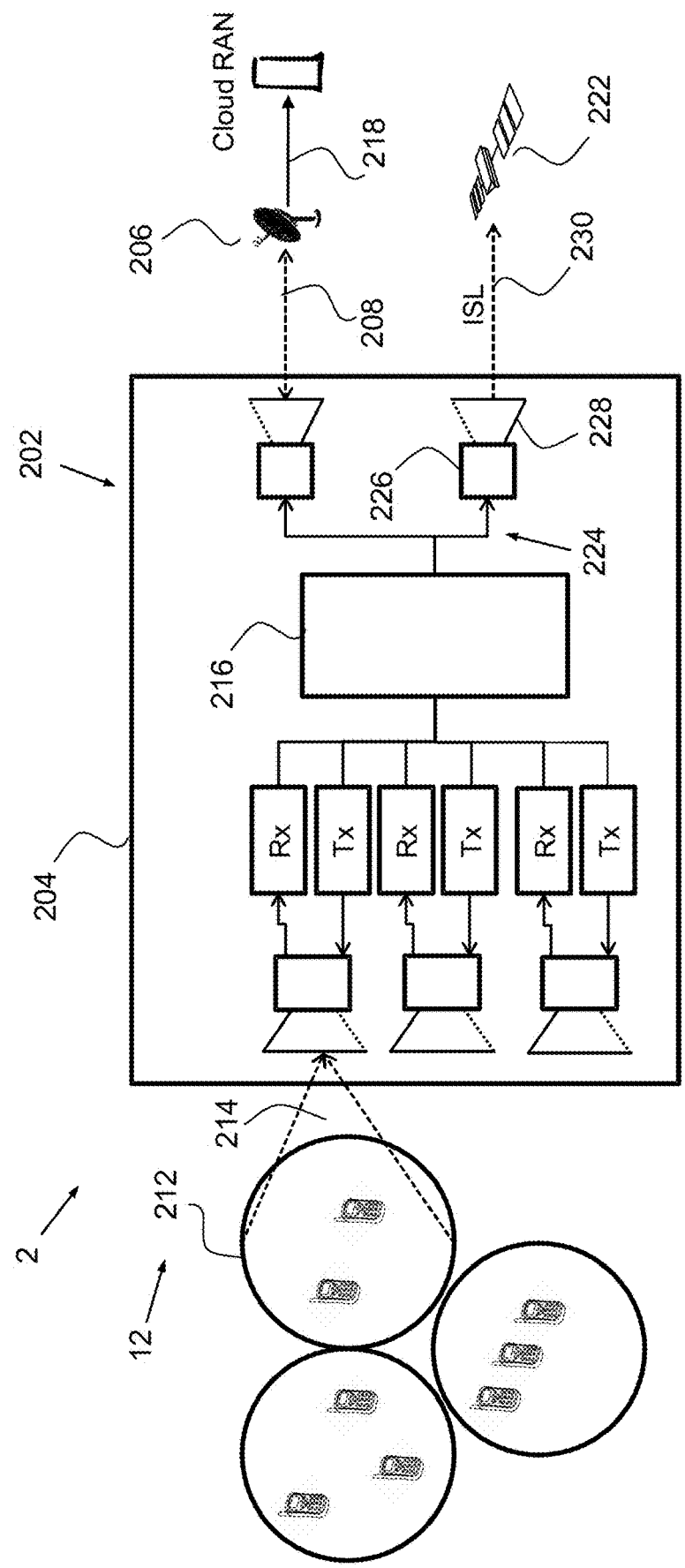
FIG. 3 is a view of the system of FIG. 1 which details the architecture of the satellite forming here the space relay of the space system.

According to FIG. 3 and a typical architecture of a satellite relay station 252 of the multibeam satellite system 12 of FIG. 1, integrated into the integrated system 2, the satellite relay station 202 comprises a satellite 204 and at least one satellite remote radio head RRH-S 206, connected to the satellite 204 through a bidirectional link 208 for access to the network of the terrestrial infrastructure.

The satellite relay station 202 is configured to digitize an aggregate of signals originating from one and the same satellite cell 212 and received in an associated beam 214 of first up-path of the satellite 204 and to generate a stream of data toward the C-RANs in the same format as the RRHs.

The digitization may be done on board the satellite 204 with the aid of a digital processor or directly in the satellite remote radio heads RRH-S 206.

The digitized stream is put into a digitized radio over optical fiber format 218 D-RoF ("Digital Radio over Fiber") defined according to protocols such as CPRI ("Common Public Radio Interface") or OBSA ("Open Base Station Architecture Initiative").

The satellite 204 is configured to convey an aggregate of signals originating from one and the same satellite cell to another satellite 222 through a transponder channel 224, connected at output to a transmitter 226 and an inter-satellite link 230 antenna 228, when the satellite cell is devoid of any RRH such as for example in the case of coverage of a maritime area far from coasts.

Figure 4:
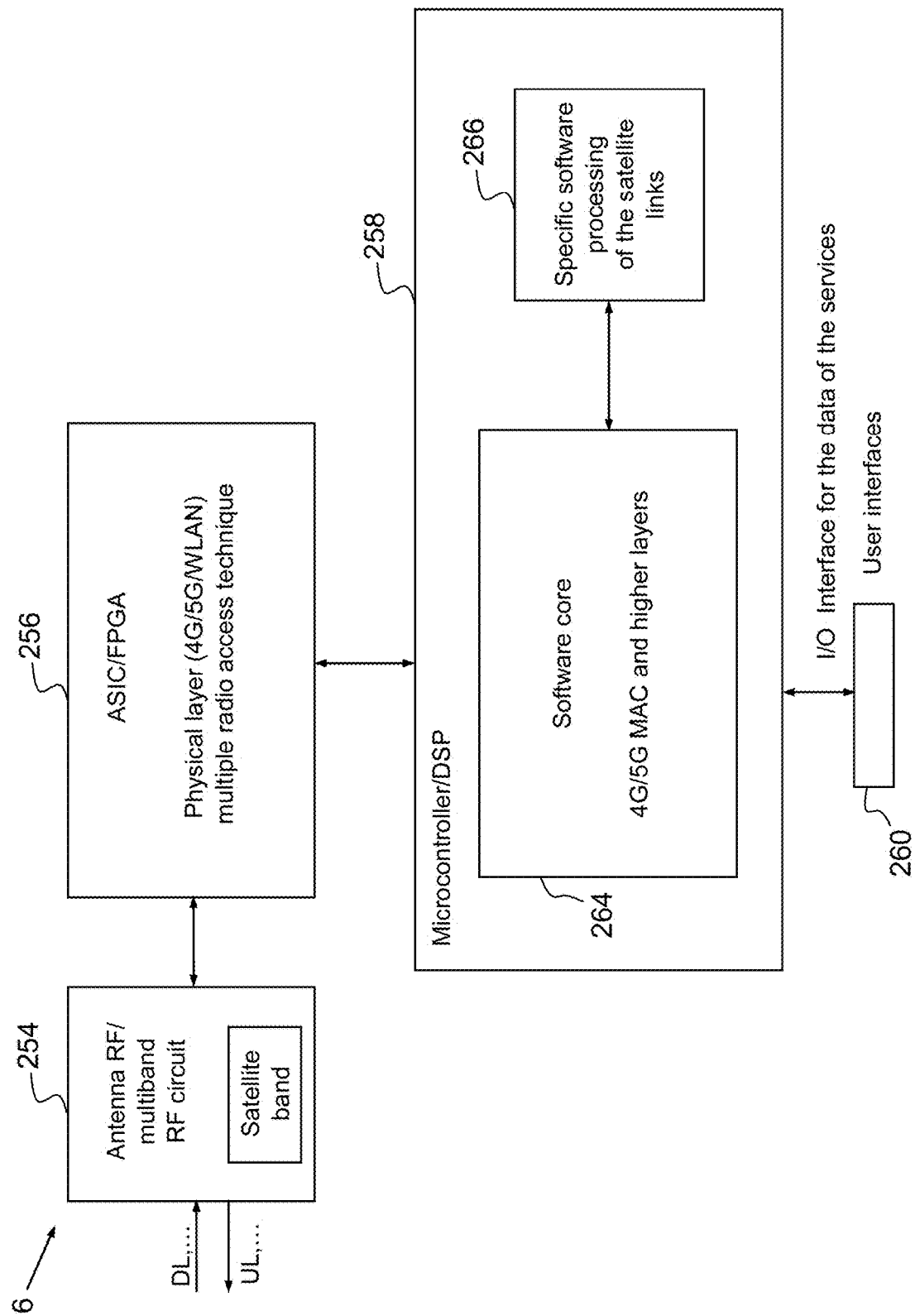
FIG. 4 is a view of the architecture of a multi-mode terminal according to the invention integrating as far as the physical layer the implementation of communication(s) of at least one terrestrial cellular network and of the space system according to the invention.

According to FIG. 4 and a typical architecture of an integrated user terminal 6 of the multibeam satellite system 12 according to the invention of FIG. 1, the integrated terminal 6 is configured to process and utilize the same waveform as that used by the space system and the terrestrial system.

The user terminal 6 is structured hardware-wise so as to be able to configure in a software manner the RF parameters of the hardware platform of the terminal and also the protocol of the radio interface, for example the NB-IoT, or Narrow Band Internet of Things, protocol undergoing standardization at the 3GPP to allow satellite-based operation.

The user terminal 6 comprises a first radiofrequency circuit RF 254, including an antenna and multi-band RF components, a second digital circuit 256 of ASIC/FPGA type to process the physical layer (4G/5G/WLAN) and using a multiple radio access technique, and a third digital circuit 258 of microcontroller/DSP ("Digital Signal Processor") type to process the 4G/5G MAC ("Medium Access Control") layer and the higher layers of the terrestrial mobile networks and to process the protocols of the satellite links according to the invention.

The user terminal 6 also comprises user/terminal interface devices 260, connected by bidirectional links to the third digital circuit 258.

The first RF circuit 254 is configured, by the possible addition of specific RF circuit elements of the satellite links, to be able to communicate on the satellite mobile service bands.

The user terminal 6 is also permitted to implement the transport protocol, already implemented in the second and third digital circuits 256, 258 when the terminal operates in terrestrial mode, and to fulfill with this transport protocol the requirements of 5G standardization of narrowband access applicable for the transmission of IoT services (NB-IoT) in the most successful current version and forthcoming versions when the system uses the space system.

The third digital circuit comprises a software core 264 which is formed of program instructions and of a database and which is configured in conjunction with the second digital circuit so as to process the signals exchanged in the channels of the terrestrial mobile cellular networks. The software core of the third digital circuit and the second digital circuit form a software radio stage able to operate in multiple bands allocated to the mobile service, such as for example the 900 to 2500 MHz frequency range.

The first, second and third circuits of the terminal are configured at the hardware level and at the software level to allow software configuration both of the RF parameters of the hardware platform of the terminal and also of the protocol of the radio interface, in particular the NB-IoT (Narrow Band Internet of Things) protocol, in the case of a satellite-based operation.

This software configuration is carried out by the implementation of all or some of a set 266 of additional software modules, which are specific to the processing of a space communication according to the invention and are implanted, in the form of recorded instructions and data, in the third digital circuit 258.

The set 266 of additional software items comprises:
- a software module for selecting the cellular or mixed, satellite mode of operation; this module being based on a mechanism for detecting the availability of the services and resources of a terrestrial cellular system and/or of the satellite mobile system and in general favoring the use of a terrestrial cellular system. This configuration differs from the configuration of a conventional cellular access such as WIFI for example, in the sense that a modem and a single chip (or chipset) are used here to communicate on one channel or the other;
- a software module for parametrizing the software radio according to operation in the bands allocated to the satellite-based mobile service MSS (Mobile Satellite Service);

a software module for selecting the bandwidth or the number of emission/reception carriers which is suited to the satellite channel;

a module for implementing a specific algorithm for contention access according to the invention in particular on the up-path with the selection of the timeouts and of the mode of transmission as a function of the type of information to be transmitted and which is suited to the satellite-based communication channel;

a module for implementing a specific power control algorithm suited to the satellite-based communication channel;

a module for implementing a specific Doppler compensation mechanism suited to the satellite-based communication channel.

This software configuration, described hereinabove, of the terminals is allowed in regard to a hardware and software architecture of a mobile satellite infrastructure which corresponds thereto.

The mobile satellite infrastructure comprises:

a suitably adapted space segment, preferably based on a constellation of non-geostationary satellites in low orbit LEO and offering a low latency compatible with certain critical applications, but which may also be based on MEO, GEO satellites and high-altitude relay platforms HAPS;

specific modems derived from the modems designed for the eNode B or 4G/5G base station. In the manner of e-Node B modems, this access station GW ("Gateway") e-Node B modem is capable of interfacing with the same nodes of the 4G/5G radio access network. This GW e-Node B modem implements the following functions:

Doppler compensation, synchronization and power control loop mechanisms suited to the satellite-based communication channel;

a mechanism for generating the signaling allowing the terminals to access the satellite network;

a mechanism for acquiring, demodulating and decoding the signal transmitted by the terminals including adaptations to the satellite channel (timers) and PHY/MAC mechanisms allowing the demodulation and the decoding of colliding messages (for example the successive suppression of interference, . . . );

modems which can be implanted on board the satellite or co-located with the access stations GW of the ground segment of the mobile satellite infrastructure.

Figure 5A:
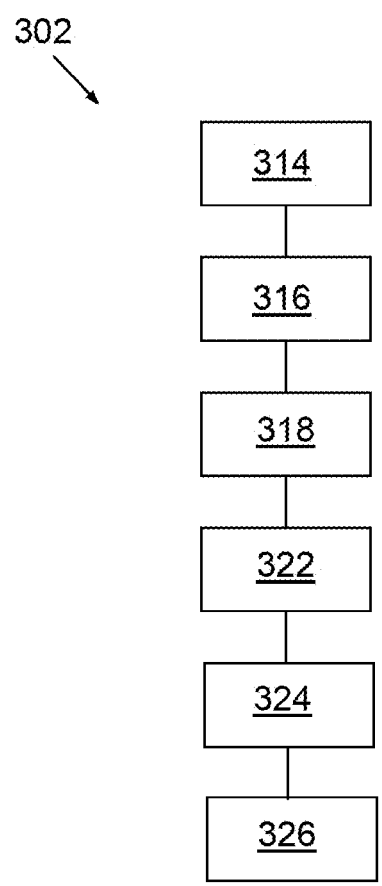
FIG. 5A is a flowchart of a method of communication according to the invention, implemented by a space telecommunications system according to the invention, such as for example that described in FIGS. 1 and 2.
Figure 5B:
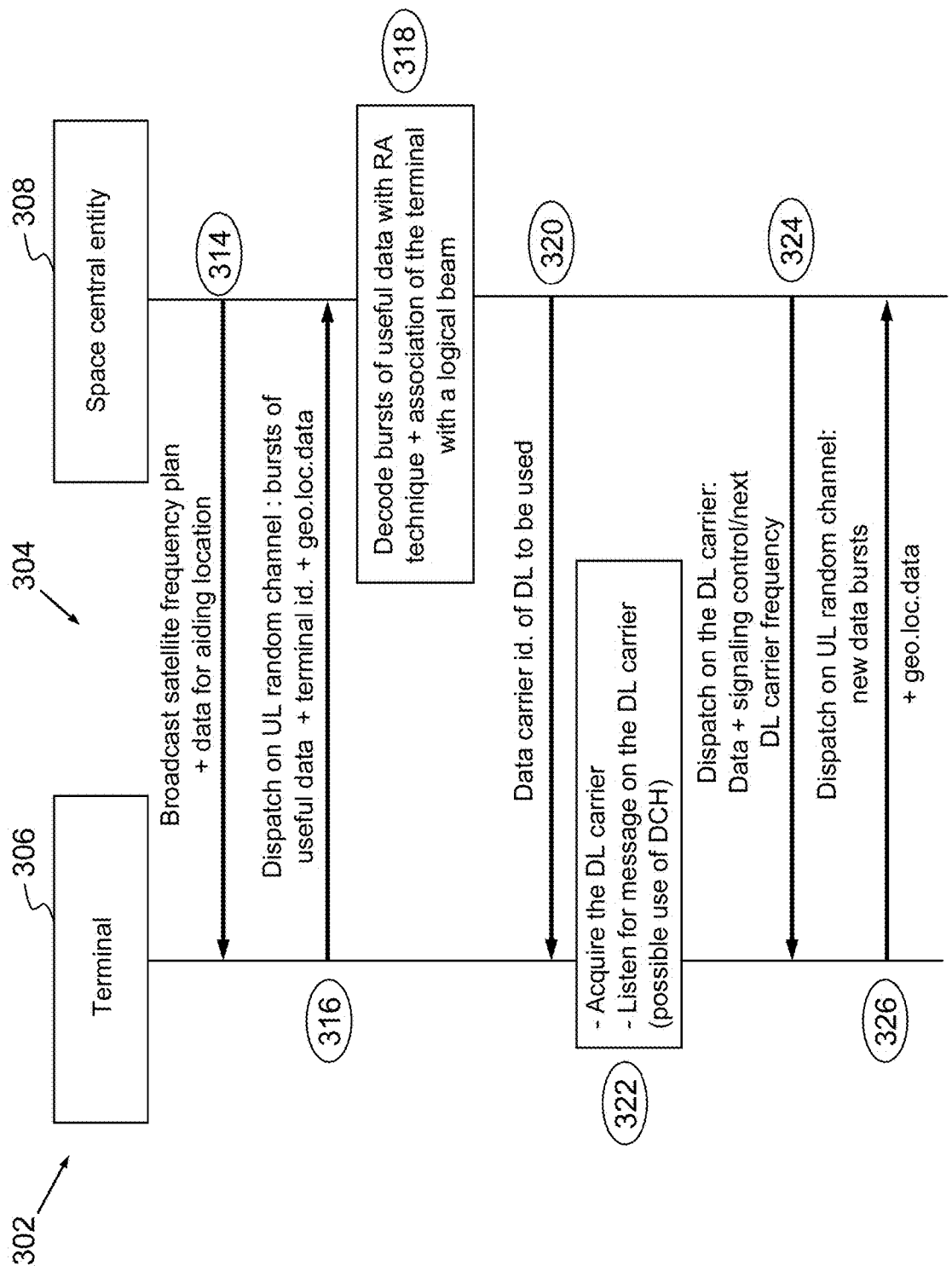
FIG. 5B is a view of a timechart of the signals exchanged during the execution of the method of space communication of FIG. 5A between a user terminal of the space system and of the space gateway GW for connecting to the fixed communications network of FIG. 1, when establishing or maintaining a space communication.

According to FIGS. 5A and 5B, a method of communication 302 according to the invention uses for example one of the space systems 12, 112 of FIGS. 1 and 2, and comprises a set of steps, executed successively, some of which are optional.

According to FIG. 5B, a chart 304 of the signals exchanged during the method of communication 302 between a terminal 306 and a central entity 308 of the space system or space system access module, which entity is implanted either at the level of the space relay (satellite or HAPS platform) or at the level of the gateway GW for connecting to the fixed ground infrastructure, is described.

The chart 304 highlights more particularly the signaling necessary for the implementation of the method of communication 302. The dashed arrows correspond to an exchange of signaling and the continuous arrows correspond to an exchange of useful data.

According to the chart 304, the steps of the method of space communication 302 according to the invention are executed in a downward sense which corresponds to a temporal axis of time flow.

According to FIGS. 5A-5B, in an optional prior step 314, the central entity of the space system, that is to say the space relay or the gateway GW, emits a signaling message giving information on a frequency plan of the return pathway or the identifier of this plan and optionally information for aiding geo-location to aid the geo-location of the terminals. This signaling message is dispatched continuously over the whole of the coverage of the satellites at a given period. The carrier frequency for dispatching this signaling is assumed known to the terminal 306, which has a set of signaling carrier frequencies in memory or has at its disposal a means of discovering it. The terminal 306 will thus test the set of carrier frequencies that it has in memory or that it obtains by using another means of discovery until it synchronizes, then it recovers the signaling information transmitted in the first signaling message. The terminal 306 can also use this step to carry out a coarse correction of synchronization of its local oscillator and to take coarse account of the doppler drift on the signaling carrier received so as to compensate these errors during the forthcoming emission.

This prior step 314 can be omitted when the terminal 306 has its own inherent geo-location means, autonomous in relation to the space radiocommunications system, such as for example a GNSS ("Global Navigation Satellite System") receiver and already knows a priori the frequency plan of the return pathway, that is to say of the uplink UL, to be used. The terminal 306 will in this case have to use doppler margins or use pre-compensations by making the assumption that it knows the ephemerides.

Thereafter in a first step 316, the terminal 306 transmits useful data in a random manner in time and in frequency on the frequency band BUL that it has acquired or validated in the prior step 314 or that it already had in memory. It therefore emits on a random uplink UL data channel a first data message in the form of one or more bursts of data predominantly of useful traffic while excluding guard bands corresponding to the doppler margins of the space system or while compensating for the doppler by virtue of one of the techniques mentioned previously. In this case a coordinated emission could also be envisaged.

According to a first variant of the first step 316, when the user terminal 306 is able to determine its geo-location by itself, the user terminal 306 includes in this first data message signaling information such as its terminal identifier and explicit or implicit information relating to its geo-location. It should be noted that a terminal, not having an autonomous GNSS receiver, may be able to determine its geo-location or to provide information for its geo-location in the case where the prior step 314 has taken place and where the terminal has received geo-location signaling originating from the central entity.

According to a second variant of the first step 316, when the user terminal is not able to determine its geo-location by itself, the waveform of the RF signal carrying the first message up to the space entity is assumed to allow the calculation by the space entity of a sufficient plurality of pseudo-distances to determine the geo-location of the user terminal 306. In this case, no explicit or implicit item of information relating to the geo-location of the terminal is included in the first message by said terminal 306.

The user terminal 306 also includes an item of information suited to the type of service that it uses or wishes to use.

For example, a bit which is set for example to 1 can make it possible to signal a "4/5G standard data" access mode and toggle to DAMA mode.

This first step could be decomposed into two phases: a first phase of entry to the satellite network with emission of one or more bursts of signaling data on the random channel and a second phase of transmitting one or more bursts of traffic data on a random access using the random channel or a deterministic access.

If the user terminal is nominally a terrestrial cellular terminal, the assumption is made that registration to the cellular network has already been carried out in the terrestrial network. In the converse case, this prior registration step will be able to be carried out also in the satellite system after adaptation of certain parameters, as will be described subsequently.

Next, in the course of a second step 318, the central entity 308 of the space system, that is to say the space relay or the gateway GW, receives and decodes the burst or bursts of data emitted by the terminal 306, and associates with said terminal a logical beam and a downlink DL carrier frequency on the basis of the location information for said terminal 306. The terminal's location information is provided in the first step 316 when the terminal is able to determine its geo-location or to aid this geo-location by the transmission of signaling information or the location information is derived from the received signal carrying the burst or bursts of data emitted when the terminal is not able to determine its geo-location or to aid the latter.

The associated logical beam is a predetermined fixed geographical area in which the terminal lies at the current instant T and which belongs to a tiling of the geographical coverage of the space system into a set of distinct geographical areas which are devoid of mutual overlap and each of which forms a different logical beam.

Each logical beam, characterized by a different geographical area, is associated in real time with a plurality of one or more physical emission beams of the space relay which at the current instant overlap the entirety of the logical beam.

It should be noted that this triple association between a terminal, a logical beam, and a carrier frequency can be terminated after a certain time of inactivity of the terminal.

Thereafter in a third step 320, the central entity of the space system transmits to the terminal on a broadcasting signaling carrier, probably identical to that used in the first step, the characteristics identifying the traffic downlink DL carrier, determined in the second step 318, that the terminal 306 will have to listen for in order to receive the useful or control traffic which is intended for it.

Next, in a fourth step 322, the terminal 306 undertakes the acquisition of the downlink DL traffic carrier which may if relevant use a duty cycle to limit the terminal's energy consumption.

Subsequently and in an optional manner in a fifth step 324, the central entity 308 of the space system, i.e. the space relay or the gateway GW, transmits to the terminal 306 on this downlink DL acquired traffic carrier control information or data relating, for example, to congestion control, stream control, the reduction of the frequency plan to manage heterogeneous requests between areas, as well as the information allowing said terminal to determine a next traffic-carrier frequency in the case in particular of a change of satellite (satellite handover).

On this downlink DL traffic carrier, the information related to the frequency plan and to geo-location may optionally be repeated periodically.

Next, the first and second steps 316, 318 are repeated at each new transmission of burst(s) of data by the terminal 306.

A sixth step 326 corresponding to the repetition of the first step 316 in FIG. 5A is represented.

It should be noted that if the terminal is in the same logical beam as during the emission of the previous salvo and that the central entity of the system, i.e. the space relay or the gateway GW, does not wish to change the data downlink DL traffic carrier which is associated therewith, the following steps, that is to say the third, fourth and fifth steps 322, 324, 326 are not carried out.

When the terminal has changed logical beam or when the system wishes to allot it another downlink DL traffic carrier, the third, fourth and fifth steps 322, 324, 326 are repeated.

Thus, on the uplink UL return pathway the data transmitted by the terminal are predominantly data of useful traffic while a small quantity of in-band signaling information relating essentially to the geo-location of the terminal is required. Thus, the share occupied by the signaling ("overhead") is greatly reduced and limited, and the number of terminals which have a low bitrate and sporadic traffic and which can use the space component in parallel is greatly increased.

Upon a change of satellite, the terminal must undertake the acquisition of a new data downlink DL carrier of which the central carrier frequency or an equivalent item of information is signaled in the current DL traffic carrier when the event approaches in the course of the fifth step 324. This new acquisition is triggered either by change-of-satellite information originating from measurements or any other signaling, or by a loss of synchronization with the current carrier.

When the terminal loses all synchronization with the downlink current traffic carriers and those which are signaled, the terminal starts again in a phase of acquisition of the signaling broadcasting carrier such as carried out in the first step.

According to the method of communication described hereinabove, the user terminal is no longer concerned with carrying out the conventional procedures for communication switchover during a switchover between physical beams of one and the same satellite.

According to the method of communication described hereinabove, the user terminal exploits the following characteristics:

by transmitting as uplink UL to the satellite in a random manner on a frequency plan common to the whole space system and including doppler-related margins if necessary, no signaling is necessary for the frequency to be used on the return pathway;

the terminal can be reached in its logical beam on a frequency which remains unique for said logical beam as long as this beam is covered by the same satellite;

the terminal receives *a signaling indicating the next frequency dispatched in the band for the satellite or satellites which will take over.

Figure 6:
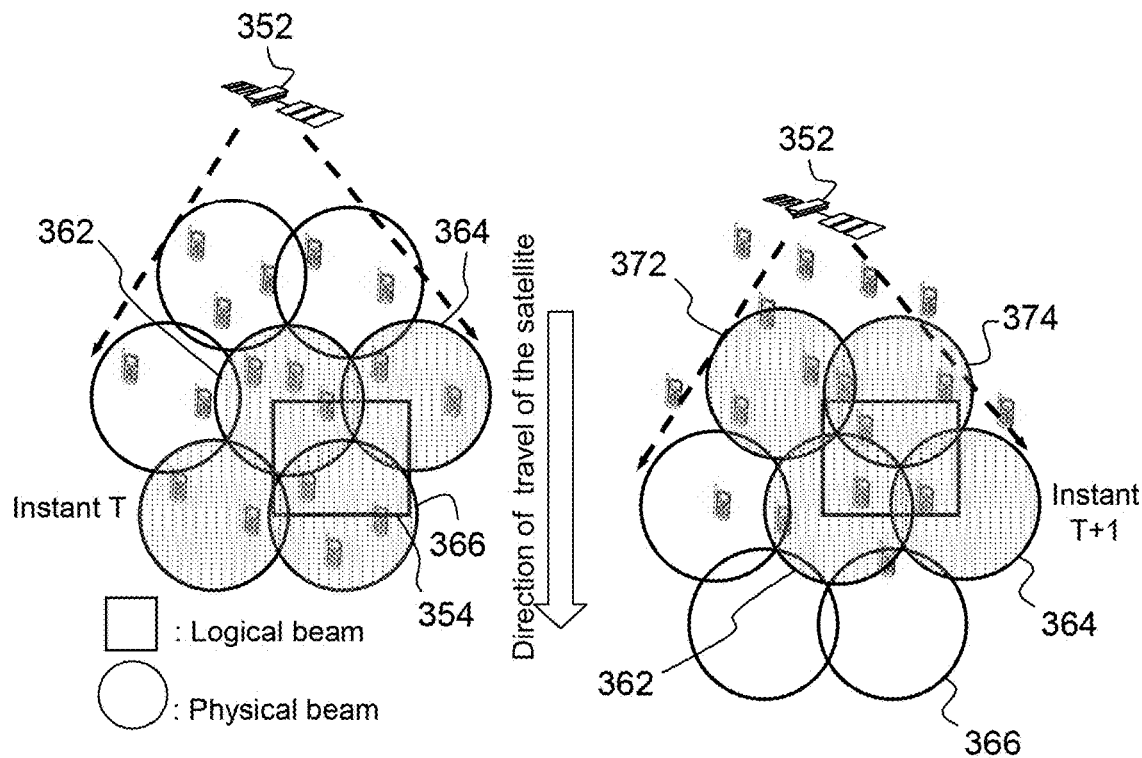
FIG. 6 is a view of the operating principle of a first embodiment of a logical beam in relation to the physical beams during a switchover between physical beams which is caused by the movement of a non-geostationary satellite.

According to FIG. 6, the principle of the logical beams and of their dynamic association over time with the physical beams of one and the same satellite 352 is illustrated. The logical beam is a fixed geographical area on the ground, for example the area 354 bordered by the dashed square, in which terminals 356, 358, 360 are located. This logical beam 354 is covered by one or more physical beams formed by the satellite at each instant.

At the instant T, three physical beams which partially overlap each other and which are designated by the first, second, third physical beams 362, 364, 366 allow global coverage of the logical beam 354. There is therefore at this instant T an association between these three physical beams 362, 364, 366 and the logical beam 354, thereby implying that the information to be dispatched to this logical beam 354 is duplicated in these three physical beams 362, 364, 366 at this instant T.

At a following instant T+1, the first and second physical beams 362, 364 formed by the satellite 352 continue to cover the logical beam 354, the third beam 366 no longer has a ground footprint zone of overlap of the logical beam 354. Two other beams, a fourth physical beam 372 and a fifth physical beam 374, which are adjacent to and situated respectively above the first and second beams 362, 364 in FIG. 6, supplement the coverage of the logical beam 354. At this instant T+1, it is therefore the four physical beams, the first, second, fourth and fifth physical beams 362, 364, 372, 374, that overlap and are associated with the logical beam 354.

The notion of logical beams makes it possible to simplify the management and the allocation of the transmission resources so as to have a unique carrier frequency per terminal for a given satellite and thus avoid complex management of inter-beam switchover.

Figure 7:
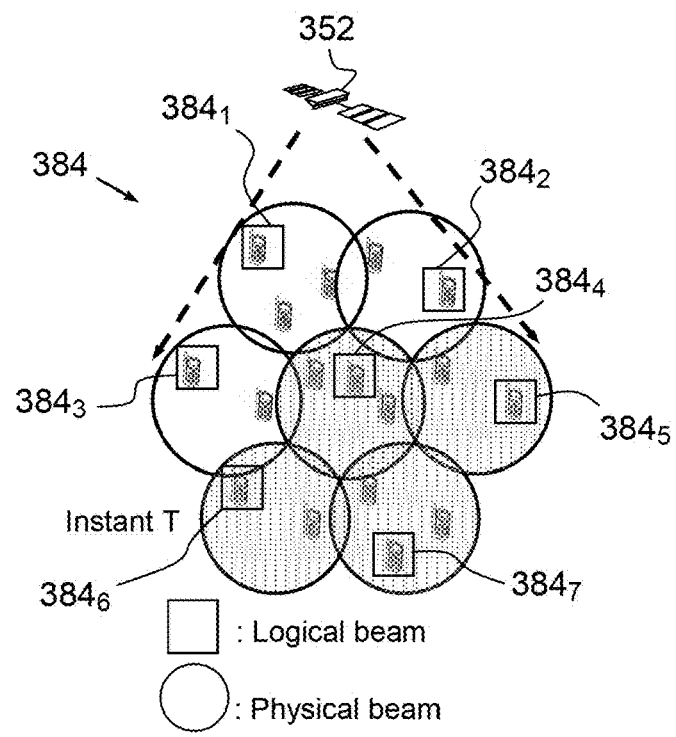
FIG. 7 is a view of the operating principle of a second embodiment of a logical beam in relation to the physical beams of one and the same satellite.

As a variant and according to FIG. 7, it is possible to consider that a logical beam 384 does not correspond to a unique compact geographical area, but to a discrete set of terminals distributed according to a finite number of compact elementary geographical areas $384_1$, $384_2$, $384_3$, $384_4$, $384_5$, $384_6$, $384_7$ in one piece, which here are distributed in a homogeneous and isotropic manner.

Generally, the compact elementary geographical areas are distributed according to spacing distances between spacing areas between neighboring areas and a distribution function of said spacing distances.

Preferably, the compact elementary geographical areas are distributed as a cluster or several clusters.

This involves very great complexity of the management of the overlaps of inter-satellite coverage when a constellation of satellites is used, for example a constellation of LEO satellites deploying in low orbit.

Figure 8:
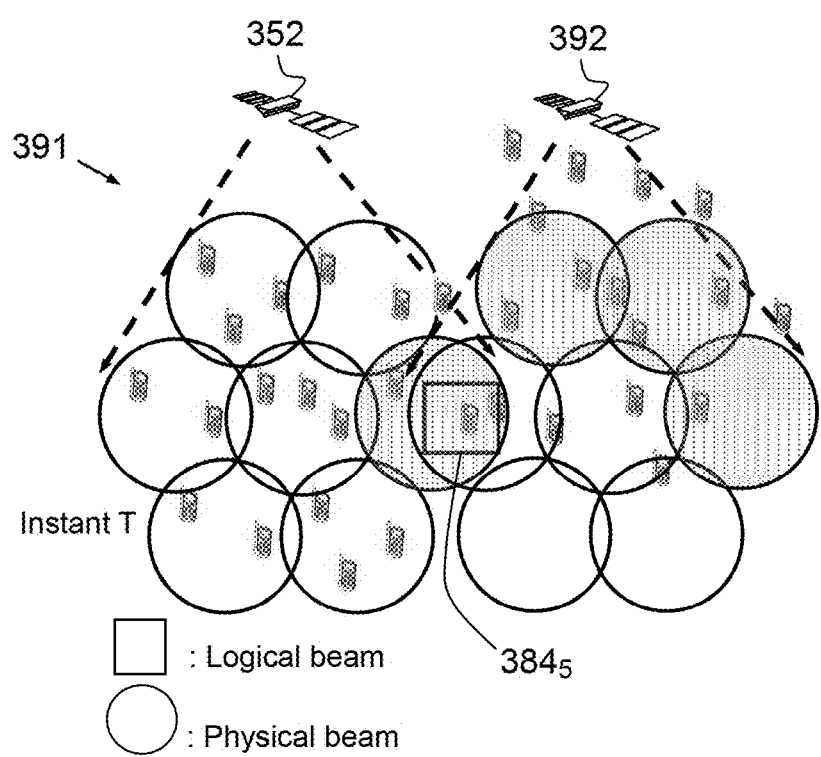
FIG. 8 is a view of the operating principle of the second embodiment of a logical beam of FIG. 7 in relation to the physical beams of two satellites overlapping it at a given instant.

According to FIG. 8, a configuration 391 of a multi-satellite coverage, here two satellites 352, 392, illustrates the constraints exerted on the logical beams because of their association with physical beams generated by satellites situated on adjacent orbital planes, that is to say ones which are immediately neighboring and sufficiently close for their geographical coverages to overlap at least partially. The maximum size of the elementary logical beam $384_5$ can thus be constrained by the inter-satellite overlap to minimize the management between adjacent satellites 352, 392. Thus a logical beam is constrained at any instant to be handled wholly by one and only one satellite.

Figure 9:
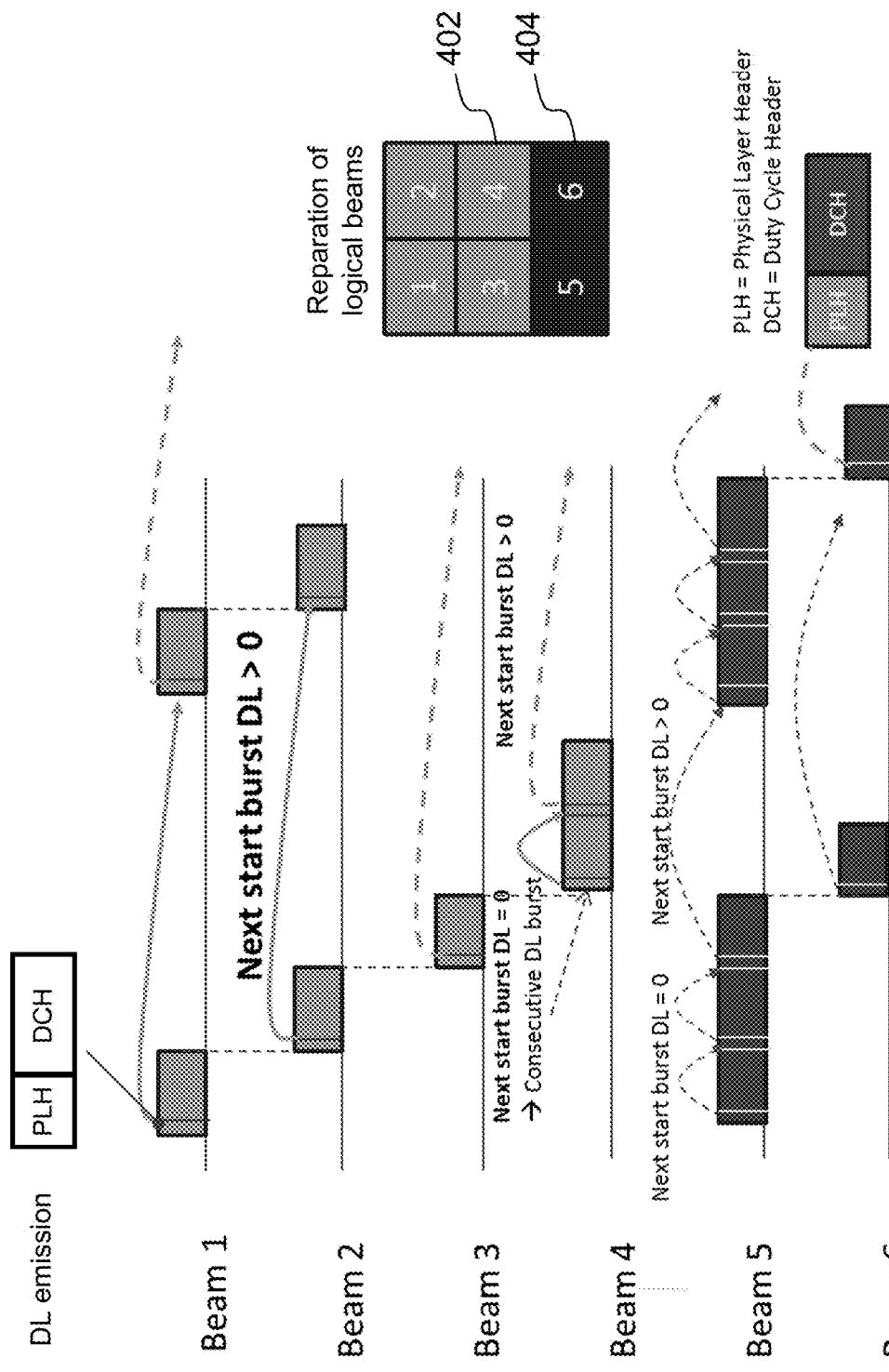
FIG. 9 is a view of the downlink DL DCH ("Duty Cycle Header") signaling dispatched by a satellite to terminals belonging to logical beams which differ and allowing the implementation of an economy strategy for saving electrical energy of the set of the terminals.

According to FIG. 9, the principle of using "in-band" signaling in a DCH ("Duty Cycle Header") header allowing economic management of the electrical energy expended by the terminals is illustrated with the aid of an example of a transmission scheme in which two downlink DL downgoing frequencies for six logical beams, numbered here from 1 to 6, benefit from a frequency reuse with a pattern of four logical beams.

Data to be transmitted to a terminal are emitted in a salvo of a downlink DL on the traffic carrier that a terminal must listen to according to the fifth step of FIG. 4. A downlink DL salvo can contain data bound for several terminals, and each terminal filters and so extracts the data that are addressed to it. This downgoing DL burst is emitted per logical beam. In order to economize on the energy expended by the user terminal and to minimize the transmission power of the satellite, each downlink DL downgoing burst transmits information describing where, that is to say at what downlink DL downgoing frequency, and when, that is to say from what instant, the next downgoing DL burst will be emitted by the satellite and expected by the terminal. Thus the terminal actuates its "wakeup" when necessary, that is to say only when data are liable to be addressed to it.

For one and the same downlink DL frequency, there is no emission on one and the same logical beam between two consecutive salvos but there may be emission on the same logical beam or on another interfered logical beam, adjacent or non-adjacent, at different instants separating non-consecutive salvos. However, one and the same downlink DL frequency can advantageously be reused between two non-adjacent logical beams of sufficient isolation in terms of interferers.

This so-called "in-band" signaling, that is to say contained in a downlink DL downgoing burst, consumes relatively little in terms of volume, i.e. number of data bits transmitted. Preferably and advantageously and according to a first variant, this signaling is transmitted in the level 2 (in the sense of the standardized classification into layers of a communication protocol) payload of the data packet (data burst) so as to be compatible with existing waveforms. It can also be envisaged in a second variant to transmit said signaling in the header of the physical layer. According to this second variant, preferably and advantageously this signaling is rendered robust to transmission errors by a coding appropriate to low signal-to-noise ratios since this signaling describes gradually, that is to say from one burst to the next, the downgoing DL traffic. This signaling referred to by the abbreviation "DCH" ("Duty Cycle Header") thus describes at least the following two items of information:

the next downgoing frequency that the terminal must listen to, referred to here by the generic term "next frequency burst DL"; for example the next downgoing frequency that the terminal must listen to may be referenced to a known index or frequency channel number or a relative frequency value with respect to the current frequency; and the next start instant from which the terminal must listen, referred to here by the generic term "next start burst DL"; the next start instant indicates the start instant of the next downgoing DL burst and can be expressed as a multiple number of bursts from the end of the current burst listened to.

According to FIG. 9, by simplicity and efficiency of the system all the downgoing DL traffic bursts have one and the same size and one and the same physical format. To describe several consecutive downlink DL downgoing bursts the value of "next start burst DL" is taken equal to 0. Otherwise its value is a multiple of N*bursts DL, N being a parametrizable system parameter, by default set equal to 1.

The physical layer PHY also contains a Physical Layer Header PLH describing very generally a unique word and a frequency and symbol tempo recovery sequence. This header can also identify the size of the downgoing DL burst which follows with suitable signaling that is robust to transmission errors. For example two bits make it possible to characterize four possible widths of downgoing DL salvos for this energy economizing service at the level of the user terminal. As a variant and preferably, the signaling which identifies the size of the downgoing DL burst which follows is included in the level 2 payload data packet and not in the header of the physical layer, thereby avoiding modifying the waveform.

The algorithm for allocating and scheduling or forecasting the downgoing DL traffic on each satellite and on each downgoing DL physical beam can exploit the knowledge of a geographical and temporal distribution of the traffic demand, of the isolation between physical beams, and can on the basis of this knowledge define a schedule of frequencies and instants of start of terminal listening for each satellite and each logical beam.

The term Duty Cycle used, related to the waking up of the terminal or complementarily to the awaking of the latter, then results from the fact that a downgoing DL allocation pattern in terms of transmission resources for a given logical beam changes only as a function of the geographical and temporal distribution of the traffic demand and of the variations of interferers between physical beams on motion of the satellites.

According to the example of FIG. 9, at a given instant, two groups of logical beams, a first group 402, designated by the set of numbers {1, 2, 3, 4}, comprising the four logical beams numbered from 1 to 4, and a second group 404, designated by the set of numbers {5, 6}, comprising two logical beams numbered from 1 to 2, are distributed on the ground according to a predetermined geographical distribution pattern.

The first and second groups 402, 404 reuse respectively one and the same first downgoing DL frequency f1 and one and the same second downgoing DL frequency f2. For a given group of logical beams the downgoing emissions are temporally disjoint. Thus the downgoing emissions at the first downgoing frequency f1 on the four beams 1 to 4 of the first group are temporally disjoint, and the downgoing emissions at the second downgoing frequency f2 on the two beams 5 and 6 of the second group are temporally disjoint.

Each downgoing DL burst signals in its header the next frequency to be listened to and the instant of the start of the next downgoing burst to be received or else follows a predefined pattern. A user terminal places itself in a rest state for the duration which separates the end of the last burst listened to which is intended for it and the known instant of start of the next expected consecutive burst which is intended for it, data not however necessarily being addressed to it in each burst that it demodulates.

This example also illustrates the number of consecutive downgoing DL bursts per logical beam, this number depending on the downgoing traffic load. The first and second frequencies are indicated in the headers DCH by a corresponding identifier.

Figure 10A:
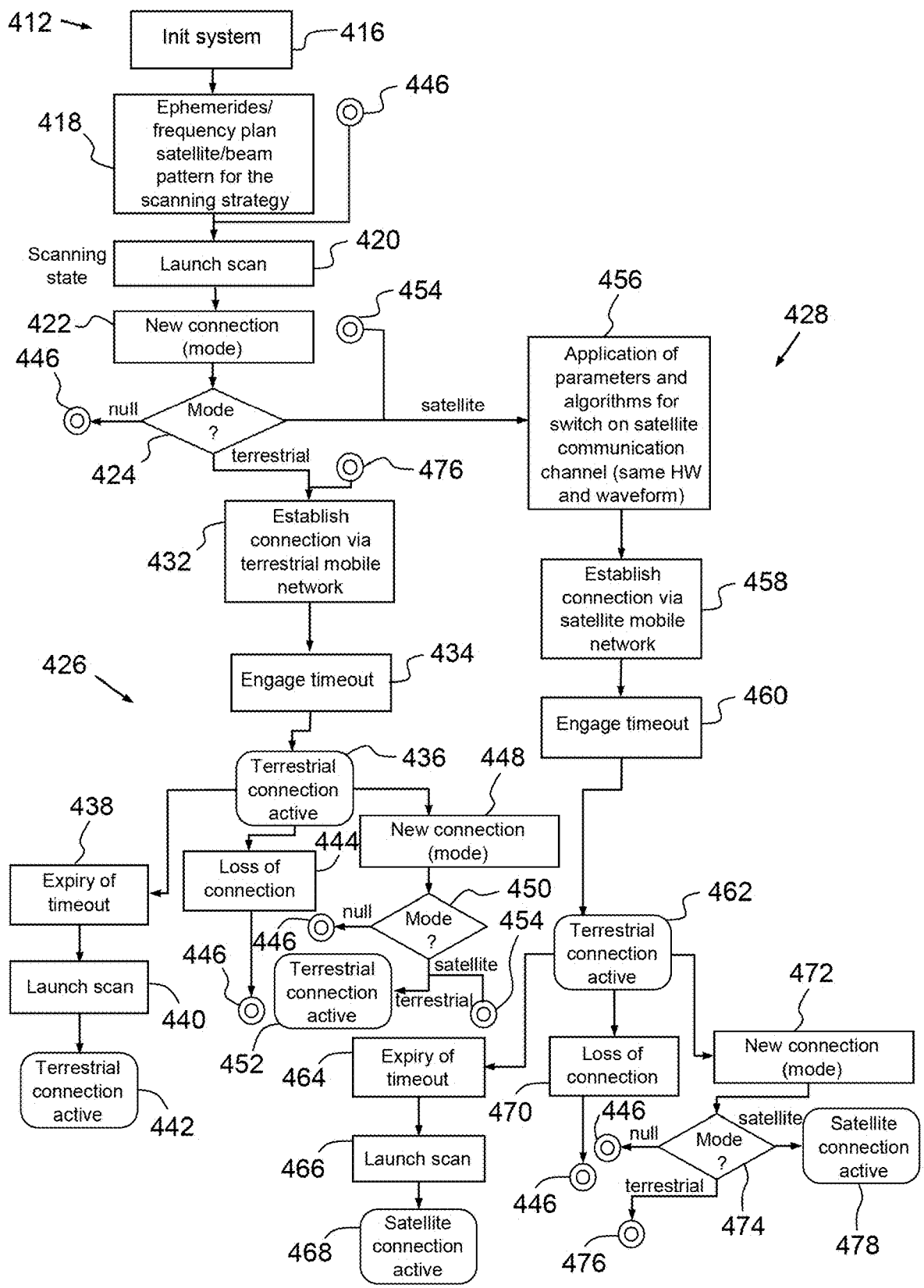
FIG. 10A is a detailed flowchart of an exemplary algorithm allowing the switchover of a communication between a terrestrial cellular system and a space system as a function of the availability of each of the transmission channels associated with said system and of a particular strategy for selecting a system from among the two.
Figure 10B:
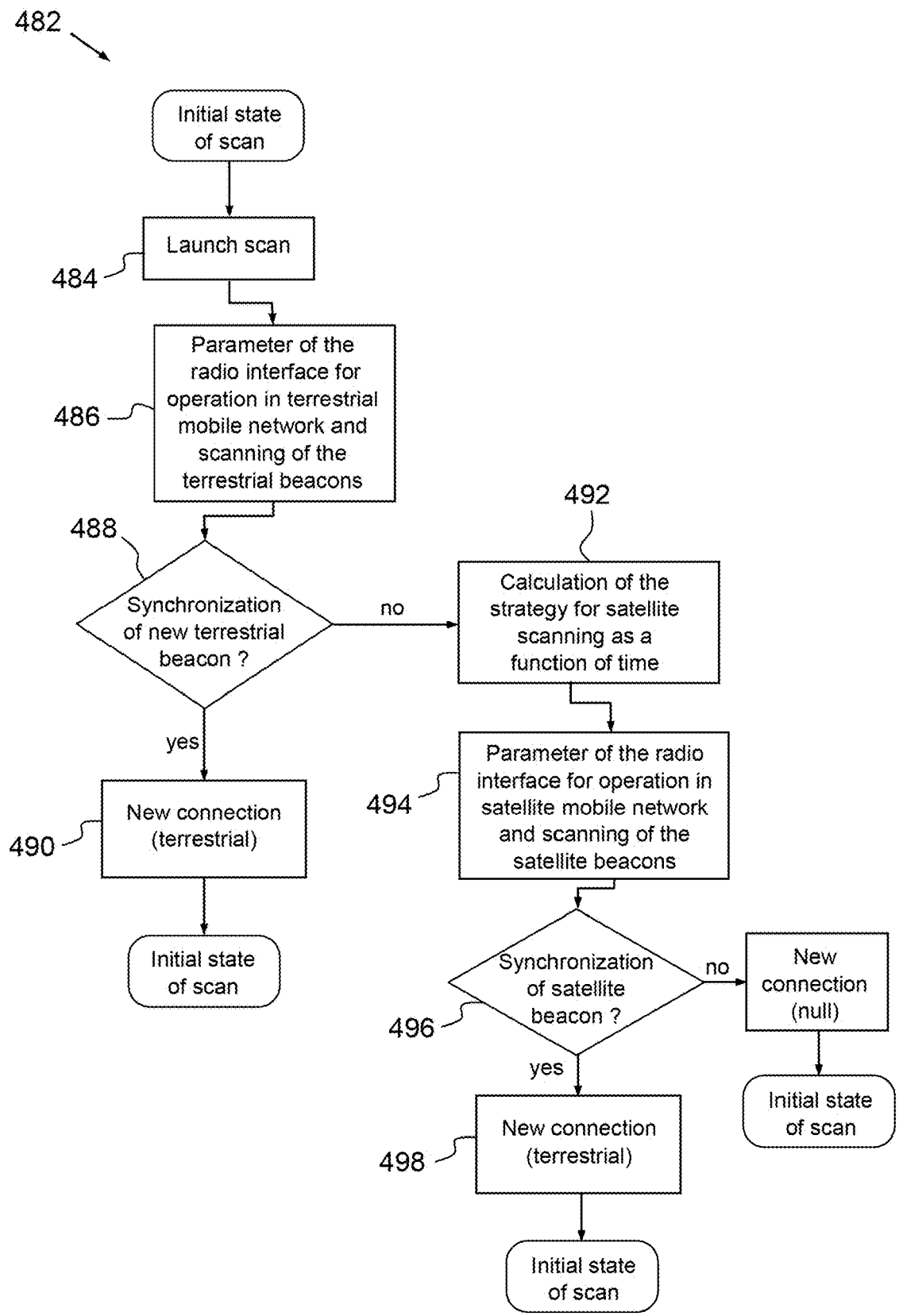
FIG. 10B is a detailed flowchart of an algorithm used by a step of the switchover method of FIG. 10A, said step allowing the evaluation of the availability of the two systems, terrestrial and satellite, and the carrying out of the selection strategy.

In the case of a user terminal which nominally uses a terrestrial or assimilated network and which wishes to be able to enter the space system of the invention described hereinabove, specific procedures according to the flowcharts of FIGS. 10A and 10B are used to allow it said entry to the space network or connection to the latter and the carrying out of the steps of a communication in the space system such as are described in FIG. 5A.

The flowcharts of FIGS. 10A and 10B describe an algorithm for automatically selecting the type of mobile network from among a terrestrial cellular network or a space network (satellite network or assimilated HAPS network) allowing transparency and maintaining of the session. The algorithm describes at a high level the protocol making it possible to select one or the other of the accesses as a function of the availability of these accesses and of a preferential strategy of use of said accesses mutually. Here, the preferential strategy used in FIGS. 9A and 9B is to favor, as a general rule, terrestrial access when it is available and to ensure spatial global coverage of umbrella type when terrestrial access is no longer accessible.

However, other strategies can be envisaged. For example when a service requires particularly high availability, it will be possible to envisage a system diversity solution in which a first connection of the terminal to the terrestrial cellular system and a second connection of the terminal to the multibeam space system are active at the same time.

According to FIG. 10A, the switchover method 412 comprises a set of following steps.

After a first step 416 of initializing the integrated system, in a second step 418, a scanning strategy is provided to the user terminal, namely the order in which the frequencies of the terrestrial mobile and satellite systems are scanned.

For example, the frequency plan of the terrestrial mobile and satellite systems as well as the scanning strategy are provided to the terminal by the terrestrial mobile system and/or the satellite mobile system. The frequency plan can also be prerecorded in the user terminal.

According to another example, ephemerides of the satellite or satellites, a frequency plan of the carriers that are used by the satellite or satellites, and a spatial pattern and/or physical beams, and a frequency plan of the carriers of the terrestrial mobile system are provided to the user terminal which has at its disposal a program allowing it to determine a beacons scanning strategy.

Next, a third step 420 of launching scanning and listening for the broadcasting carriers, called beacons, of the terrestrial mobile system and/or of the space mobile system, is implemented according to the algorithm 482 of FIG. 10B, and provides an indication of the new mode of connection to be selected from among the "terrestrial" mode, the "space mode", and the "null mode" corresponding respectively to a new connection to the terrestrial cellular system, a new connection to the space system, and to an absence of connection. This step implements the scanning strategy provided in the second step 418, namely the order in which the frequencies of the terrestrial mobile and satellite systems are scanned.

Thereafter, as soon as the third step 420 is able to provide the indication of the mode of the new connection to be selected, a fourth step 422 validates this indication.

Next, in a fifth step 424, the terminal selects the mode of the new connection on the basis of the indication, validated and provided in the fourth step 422, of the mode of the new connection to be selected.

When the "terrestrial" mode is selected a first subset of steps 426 is executed, whilst when the "space" mode is selected a second subset of steps 428 is executed.

When the "null mode" is selected, a branching of the method 412 is performed to the start of the third step 420.

The first subset of steps 426 comprises a sixth step 432, executed first, in the course of which the connection via the terrestrial mobile network is established.

Next, in a seventh step 434, a timeout is engaged.

Thereafter in an eighth step 436 the terrestrial connection is activated and the communication can take place.

In the course of this eighth step 436, the following three events are monitored: the expiry of the timeout, the loss of the current connection, and the indication of a mode of new connection.

When, in a ninth step 438, the expiry of the timeout has been detected, a tenth step of launching a scan 440 is executed, the scan being described by the method of FIG.

10B. Next, an eleventh step 442 of branching to the eighth step 436 is executed without interrupting the connection in progress.

When, in a twelfth step 444, a loss of current connection is detected, a branching of the method 412 is performed to the input 446 of the third step 420.

When, in a thirteenth step 448, the indication of a mode of a connection is detected subsequent to the execution of the scan launched in step 440, a fourteenth step 450 is executed in the course of which the terminal selects the mode, such as indicated and validated in the thirteenth step 448, of the new connection.

When the "terrestrial" mode is selected in the fourteenth step 450, a fifteenth step 452 is executed in the course of which a branching to the eighth step 436 and a timeout engagement are performed jointly.

When the "satellite" mode is selected in the fourteenth step 450, a branching is performed to the input 454 of the second subset of steps 428.

When the "null" mode is selected a branching of the method 412 is performed to the input 446 of the third step 420.

The second subset of steps 428 comprises a sixteenth step 456, executed first, in the course of which the parameters and the algorithms relating to the satellite system are applied by the terminal to switch onto the satellite communication channel while using the same hardware and the same waveform as for the terrestrial system.

Next, in a seventeenth step 458, the connection via the satellite mobile network is established.

Thereafter, in an eighteenth step 460, a timeout is engaged.

Next, in a nineteenth step 462 the satellite connection is activated and the communication can take place.

In the course of this nineteenth step 462, the following three events events are monitored: the expiry of the timeout, the loss of the current connection, and the indication of a mode of new connection.

When, in a twentieth step 464, the expiry of the timeout has been detected, a twenty-first step 466 of launching a scan is executed, the scan being described by the method of FIG. 10B. Next, a twenty-second step 468 of branching to the nineteenth step 462 is executed without interrupting the current communication in progress.

When, in a twenty-third step 470, a loss of current connection is detected, a branching of the method is performed to the input 446 of the third step 420.

When, in a twenty-fourth step 472, the indication of a mode of a connection is detected subsequent to the execution of the scan launched in step 466, a twenty-fifth step 474 is executed in the course of which the terminal selects the mode, such as indicated and validated in the twenty-fourth step 472, of the new connection.

When the "terrestrial" mode is selected in a twenty-fifth step 474, a branching is performed to the input 476 of the sixth step 432.

When the "satellite" mode is selected, a twenty-sixth step 478 is executed in the course of which a branching to the nineteenth step 462 and a timeout engagement are performed jointly.

When the "null" mode is selected a branching of the method 412 is performed to the input 446 of the third step 420.

According to FIG. 10B, the method 482 of evaluating the availability of the channels of the terrestrial cellular and satellite systems by scanning of beacons and of providing the indication of the system to be selected in the form of a mode of a new connection comprises a set of steps.

This set of steps implements the scanning strategy described previously, namely the order in which the frequencies of the terrestrial mobile and satellite systems are scanned. This will for example make it possible to give priority to one of the two modes from among the "satellite" mode and the "terrestrial" mode. An example of this set of steps giving priority to the terrestrial mobile system is described hereinbelow.

In a twenty-seventh step 484 of commencing, the scanning of the carriers of the terrestrial and satellite systems commences and this twenty-seventh step is triggered by steps 420, 440, 466.

Next, in a twenty-eighth step 486, the radio interface of the terminal is parametrized to operate in a terrestrial mobile network and performs the scanning of the beacons of the terrestrial network.

Thereafter in a twenty-ninth step 488 of testing, it is determined whether a synchronization on a new terrestrial carrier is possible.

In the affirmative, in a thirtieth step 490 a terrestrial mode of new connection to be selected is identified and indicated to the terminal for validation.

Conversely, that is to say if a synchronization on a new terrestrial carrier is not possible, a thirty-first step 492 is executed, in which a strategy for scanning the beacons of the satellite as a function of time is determined.

In a thirty-second step 494, subsequent to the thirty-first step 492, the radio interface of the terminal is parametrized to operate in a satellite mobile network and performs the scanning of the beacons of the satellite network.

Thereafter in a thirty-third step 496, it is determined whether a synchronization on a new satellite carrier is possible.

In the affirmative, in a thirty-fourth step 498 a satellite mode of new connection to be selected is identified and indicated to the terminal for validation.

Conversely, that is to say if a synchronization on a new satellite carrier is not possible, no mode of connection to a mobile network has been able to be identified. In this case a thirty-fifth step 499 is executed in the course of which a so-called "null" mode of impossibility of new connection to be selected is identified and indicated to the terminal for validation.

Figure 11:
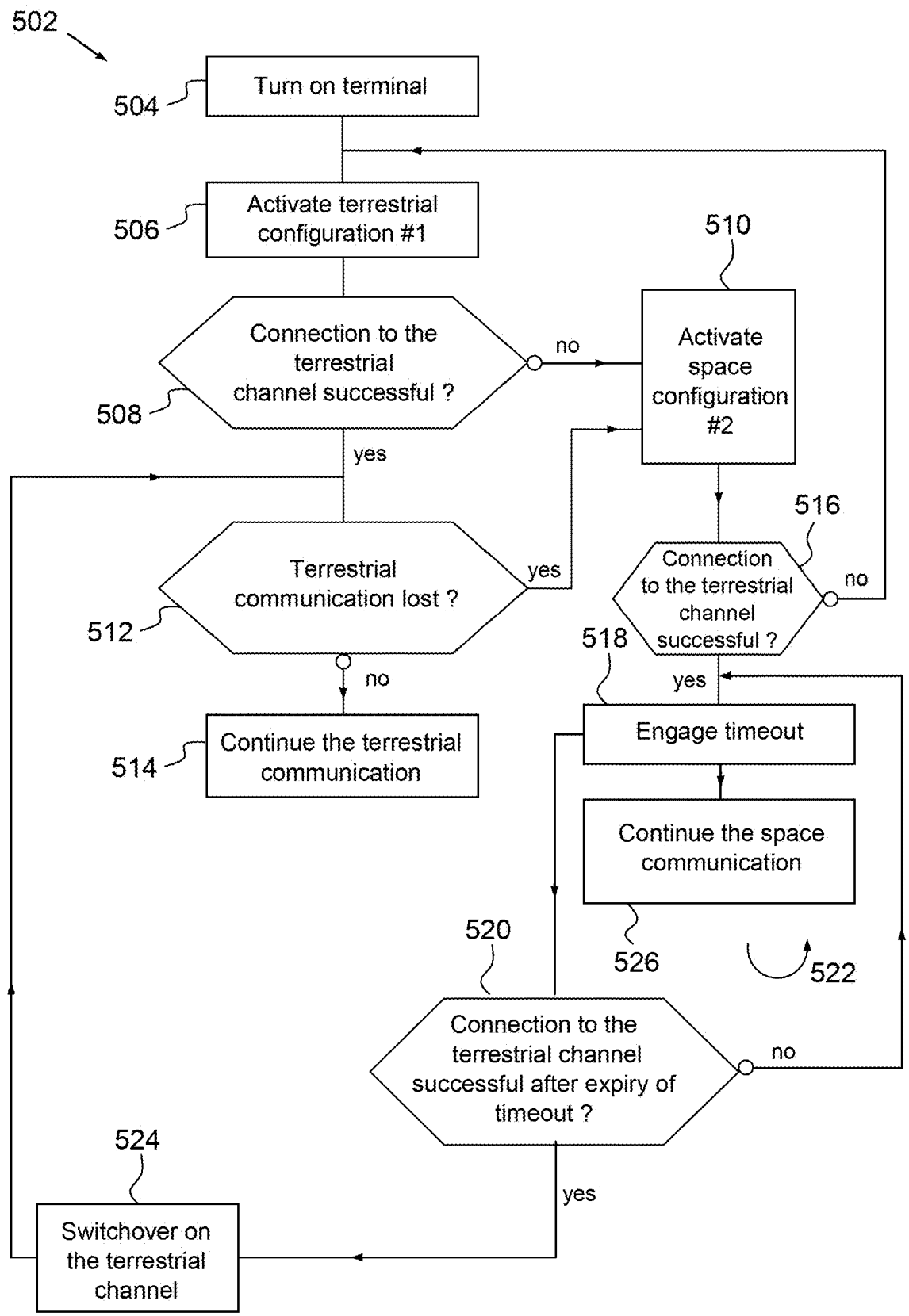
FIG. 11 is a simplified flowchart of the flowchart of FIG. 10A.

According to FIG. 11 and in a simplified manner, a method of communication 502 in a ubiquitous integrated system such as that described in FIG. 1 or FIG. 2 is configured to allow switchover between a "terrestrial" operative mode of connection to a terrestrial cellular or assimilated system and a "space" operative mode of connection to a "space" system as a function of the availability of a terrestrial channel and of a space channel (satellite or HAPS).

Switchover between the terrestrial operative mode and the satellite operative mode here favors a connection to the terrestrial cellular system and comprises a set of steps.

When the terminal is turned on in the first step 504, in the course of a second step 506, a first configuration of said terminal is established to communicate on a terrestrial communication channel by using the parameters of this communication channel which include one or more first central carrier frequency(ies), a bandwidth, an access scheme, and an associated signaling.

Next, when it is established in a third step 508 that the user terminal has failed in its attempt to connect on this terrestrial communication channel, in a fourth step 510 the terminal implements a second configuration to communicate on the satellite channel by using the specific parameters of said satellite channel which include one or more second central carrier frequency(ies), a bandwidth, an access scheme and its associated signaling, one and the same hardware being used and including one and the same modem chip (or chipset), one and the same RF transmitter and one and the same antenna.

When it is established in the third step 508 that the user terminal has failed in its attempt to connect on this terrestrial communication channel, but that it is established in a fifth test step 512 that terrestrial communication is lost, the fourth step 510 is carried out again.

Conversely, when the fifth step 512 establishes the proper state of the terrestrial communication, the latter is continued in the sixth step 514 of continuation.

When it has been possible to establish in a seventh step 516, executed subsequent to the fourth step 510, that the terminal has been able to connect to the space communication channel, periodically an eighth step 518 of engaging a timeout and a ninth step 520 of testing forming a loop 522 are repeated.

In the ninth step 520, triggered as soon as the timeout has expired, it is determined in the manner of the third step 508 whether user terminal has succeeded in connecting on the terrestrial communication channel by activating the first terrestrial configuration.

In the case of success of this connection to the terrestrial system, switchover of the communication takes place on the terrestrial channel in a tenth step 524 and the communication continues with a branching to the input of the fifth step 512 of testing.

In the case of a failure of the connection to the terrestrial system, the terminal repositions itself in the configuration of the space channel and the eighth and ninth steps 518, 520 are repeated.

In parallel and after the engaging of the timeout, the communication on the space channel is continued in an eleventh step 526 as long as a switchover on the terrestrial channel has not taken place.

The software module of the terminal of FIG. 4 which allows configuration of the necessary access scheme and makes it possible to be able to communicate on the satellite channel while remaining compatible with a current standard such as for example the 3GPP standard is one of the key points which renders the ubiquitous communication according to the invention possible.

It should be noted that a satellite component based on a low-orbit non-geostationary constellation is preferred. This satellite component is configured to interface with the core network of the cellular infrastructure or indeed with equipment for controlling the radio resources of the radio access network of the cellular infrastructure.

It is appropriate to adapt the base station or stations embedded on the satellite(s) or co-located with the access station(s) GW of the space segment by:

processing the Doppler induced by the motion of the satellites within the framework of the non-geostationary constellation by using for example the ephemerides of the satellites and also it is possible, in order to do this and to facilitate the processing, to ask the terminal to indicate its position or determine the position of said terminal, and processing the random access channel specific to the transmission channel of the satellite system.

As regards the processing of the Doppler, since non-geostationary systems may induce large Doppler disparities and a significant Doppler ramp, it is necessary to be able to rapidly acquire the frequency drift caused, which, when turning on the terminal, may lie in a window of several tens of kHz. To reduce the time required for initial acquisition and for synchronization, it may be useful to have at one's disposal information on the relative positions of the satellite and of the terminal.

Thus the terminal, via the intermediary of a GNSS (Global Navigation Satellite System) receiver, and the knowledge of the ephemerides of the satellites, may, by acting on its local oscillator, adjust its reception frequency to a value close to that actually received and suffering a Doppler drift. This mechanism makes it possible to considerably reduce the signal acquisition window.

In the same way, when emitting on a given frequency, the terminal may subtract (in algebraic value) from the nominal emission value the assumed frequency drift of the signal upon its arrival at the satellite, thereby enabling the Doppler disparity to be compensated to within second order.

The set of techniques implemented in the space component of the ubiquitous system thus makes it possible to render the cellular terminals compatible also with an operation by a space component. It makes it possible to address not only the user terminals which make frequent usage of the satellite resources, for example the user terminals installed in the so-called "white" areas, but also the occasional needs of this resource, for example the user terminals visiting said "white" areas. Activation of the satellite-based coverage extension service is done by software configuration of the terminal.

Furthermore this solution is compatible with gradual deployment with the progressive launching of satellites so as to offer initially an extension of coverage over a limited area intermittently, then to widen the service extension area with the addition of satellite(s), and then finally to increase the possibility of accessing the service.

It is also compatible with various types/sizes of NGSO satellites or indeed of HAPS. This will have an impact on the size of the coverage addressable by this space component.

Moreover on the satellite/terrestrial integration part of the invention, the proposed solution is based on the functions of the hardware constituents and the possibilities of configuration of the protocols of the radio interface undergoing standardization at the 3GPP under the name NB-IoT (Narrow Band Internet of Things). Indeed, the hardware platform of certain terminals is characterized by an agile Radio Frequency stage making it possible to operate in various frequency bands allocated to the Mobile Service in a frequency range including at least bands allocated to the satellite-based mobile service, for example in the 1518 to 2500 MHz range (software Radio). Moreover, in the context of NB-IoT standardization, bandwidths that are narrower than what can possibly be done in the previous standards and the conventional systems are achieved.

The invention claimed is:

1. A method of space communication implemented by a multibeam space telecommunications system, the multibeam space telecommunications system comprising:

a multibeam space relay taken from among a satellite and a high-altitude platform station (HAPS) platform; and a ground station, serving as interconnection gateway between a fixed terrestrial infrastructure and the space relay;

an access module for accessing a space network formed by the space relay and the ground station, said access module being embedded on board the space relay when the space relay is regenerative or embedded in the ground station when the space relay is transparent or distributed between the space relay and the ground station, at least one user terminal, the method of space communication comprising the following steps:

in a first step, the at least one user terminal emits at a given instant T on a random uplink UL data channel and in a predetermined span of frequencies to the access module one or more bursts of data predominantly of useful traffic, including an identifier and, when the at least one user terminal is able to determine its geo-location or to aid its geo-location, explicit or implicit information regarding the geographical location of said at least one user terminal; and then in a second step, the access module receives and decodes the one or more burst or bursts of data emitted by the at least one user terminal, associates with the at least one user terminal a logical beam on the basis of a location information of the at least one user terminal provided in the first step when the at least one user terminal is able to determine its geo-location or to aid its geo-location, or derived from a received signal carrying the one or more burst or bursts of data emitted when the at least one user terminal is not able to determine or to aid its geo-location, the associated logical beam wherein the at least one user terminal lies at the given instant T being a different predetermined fixed geographical area of a set of geographical areas, the set of geographical areas or set of logical beams forming a tiling of a geographical coverage of the multibeam space telecommunications system, and associates in real time with the logical beam a plurality of one or more physical emission beams of the space relay which at the given instant T overlap the entirety of said logical beam; and then in a third step, the access module dispatches to the at least one user terminal, through a broadcasting beacon whose carrier frequency the at least one user terminal already knows, an identifier of a downlink DL data channel carrier allocated to the at least one user terminal, to an associated logical beam and to the plurality of the one or more physical emission beam or beams of the space relay which at the given instant T overlap the entirety of and are associated with the logical beam of the terminal, so as to allow the at least one user terminal to receive and decode useful and control data which are intended for it.

2. The method of space communication as claimed in claim 1, wherein the first step comprises a first phase of entry to the space network with emission of said one or more bursts of signaling data on a random channel and a second phase of transmitting one or more bursts of data on a random access using the random channel or a deterministic access.

3. The method of space communication as claimed in claim 1, wherein in the third step, a down-channel DL unique carrier is allocated by the access module to the logical beam wherein the at least one user terminal lies and to its plurality of the associated logical beams.

4. The method of space communication as claimed in claim 1, furthermore comprising the following steps:

in a fourth step, executed after the third step, the at least one user terminal performs an acquisition of the carrier of the downlink DL data channel according to a carrier frequency identifier which was transmitted to it and starts listening for possible bursts transmitted on this DL carrier intended for it; and then in a fifth step, the access module dispatches to the at least one user terminal through the downlink DL data channel, at a carrier frequency of the logical beam with which the at least one user terminal is associated, one or more bursts of data, associated with the logical beam of attachment of the at least one user terminal, said dispatching in the fifth step being performed on the plurality of the one or more associated physical emission beams of the space relay which at the given instant T overlap the entirety of and are associated with the logical beam of the at least one user terminal.

5. The method of space communication as claimed in claim 4, wherein the control data relate to an implementation:

of a mechanism of contention access control on the random uplink UL data channel, including congestion control and stream control and taking into account parameters of a satellite-based or HAPS station-based communication channel, with selection of timeouts and selection of a mode of transmission as a function of the type of data to be transmitted; and/or of a specific power control mechanism suited to the uplink UL data channel; and/or of a Doppler drifts control mechanism; and/or of an economizer mechanism for saving electrical energy of the at least one user terminal based on the provision of a temporal duty cycle information item representative of a temporal sharing of one and the same downlink DL data channel carrier frequency by several logical beams served by one and the same satellite.

6. The method of space communication as claimed in claim 5, wherein the control data relating to the implementation of the economizer mechanism for saving electrical energy of the at least one user terminal are signaled in a specific signaling header containing the following two items of information:

a next downgoing frequency, next frequency burst DL, that the at least one user terminal must listen for, referenced to a known index or frequency channel number or a relative frequency value with respect to a current frequency; and a next start instant, next start burst DL, from which the at least one user terminal must listen, the next start instant indicating the start instant of the next downgoing DL burst and being able to be expressed as a multiple number of bursts from the end of the current burst listened to.

7. The method of space communication as claimed in claim 4, furthermore comprising a sixth step, executed after the fifth step, and wherein:

the at least one user terminal dispatches to the access module on a random uplink UL communication channel said one or more bursts of data as well as information relating to the location of said at least one user terminal at a new instant T+1.

8. The method of space communication as claimed in claim 4, wherein the multibeam space telecommunications system is configured to be integrated into an integrated telecommunications system, the integrated telecommunications system comprising in addition to the multibeam space telecommunications system at least one terrestrial system, the at least one terrestrial system comprising:

integrated into one or two terrestrial ground stations, a cellular terrestrial radiofrequency (RF) relay and an interconnection gateway between the terrestrial RF relay and a common fixed terrestrial infrastructure, shared with the multibeam space telecommunications system; and an additional access module for accessing the terrestrial system, formed by the terrestrial RF relay and said one or two terrestrial ground stations, said additional access module for accessing the terrestrial system being included in the terrestrial station or said one or two terrestrial ground stations, and the at least one user terminal of the multibeam space telecommunications system, configured in dual-mode or multi-mode to communicate in the multibeam space telecommunications system and/or the terrestrial system;

the method of space communication comprising the following steps executed before the first step:

in a prior step, the additional access module broadcasts to the at least one user terminal which lie in a global geographical coverage of the space relay a frequency plan of the multibeam space telecommunications system containing a list of identifiers and of respectively associated frequencies of the carriers of uplinks and of downlinks; and then in a step of scan launch and execution, the broadcasting beacons of the terrestrial system and/or of the multibeam space telecommunications system are scanned by the at least one user space terminal according to a predetermined scanning algorithm, and an indication of a mode of new connection, taken from among connection to the terrestrial system and to the space system, and to be selected is provided, this indication being dependent on respective availabilities of the terrestrial system and the multibeam space telecommunications system and a selection strategy based on priorities of a system from among the terrestrial system and the multibeam space telecommunications system, and then in a validation step, the indication of the mode of connection to be selected is validated by the at least one user space terminal; thereafter in a step of selecting the communication system by the at least one user space terminal, when a terrestrial mode is selected, the at least one terminal is connected to the terrestrial system, and when a satellite mode is selected the at least one user terminal is connected to the multibeam space telecommunications system by executing the set of first and second steps or the set of the first, second, third, fourth and fifth steps.

9. The method of space communication as claimed in claim 8, comprising a step of switching a hardware and software configuration of the at least one user terminal from a mode suited to the channels of the uplinks and downlinks of the terrestrial system to a mode suited to the channels of the uplinks and downlinks of the multibeam space telecommunications system, the switching step being interposed between the step of selecting the communication system and the first step, and being performed by applying new physical layer or media access control layer (PHY/MAC layer) parameters and new specific algorithms of the channels of the uplinks and downlinks of the multibeam space telecommunications system without changing RF chain and waveform.

10. The method of space communication as claimed in claim 8, comprising a step of control of a maintaining of the space communication, activated periodically according to a timeout of predetermined duration, in the course of which the broadcasting beacons of the terrestrial system and/or of the multibeam space telecommunications system are scanned according to the predetermined scanning algorithm, and an indication of a mode of new connection, taken from among connection to the terrestrial system and to the space system, and to be selected is provided, this indication being dependent on the respective availabilities of the terrestrial system and the multibeam space telecommunications system and the selection strategy based on priorities of a system from among the terrestrial system and the multibeam space telecommunications system, and when the indication provided is the satellite mode the communication is maintained on the space network.

11. The method of space communication as claimed in claim 10, wherein when the indication provided of the mode of the new connection is the terrestrial mode, a switching of the communication on the terrestrial system is performed without interrupting said communication on the terrestrial system.

12. The method of space communication as claimed in claim 8, wherein a strategy for selecting the mode of a new connection is based on the priority of the mode of connection to the terrestrial system with respect to the mode of connection to the terrestrial system.

13. The method of space communication as claimed in claim 1, comprising a prior step previous to the first step wherein the access module broadcasts to the at least one user terminal which lies in a global geographical coverage of the space relay and on a broadcasting beacon whose carrier frequency the at least one user terminal already knows, a frequency plan of the space system containing a list of identifiers and of respectively associated frequencies of the carriers of uplinks and of downlinks, and information for aiding the location of the at least one user terminal.

14. The method of space communication as claimed in claim 1, wherein the logical beam is a simple, compact geographical area in one piece, or the logical beam is a finite discrete set of compact elementary geographical areas in one piece, distributed according to spacing distances between neighboring areas that are predetermined.

15. The method of space communication as claimed in claim 14, wherein a shape of a geographical area, simple or elementary, is polygonal.

16. The method of space communication as claimed in claim 14, wherein the logical beam is an integer number of compact elementary geographical areas in one piece, distributed in an isotropic and homogeneous manner.

17. A dual-mode or multi-mode telecommunications terminal comprising:

a first radiofrequency (RF) circuit, including an antenna and multi-band RF components, a second digital circuit of application-specific integrated circuit type or field-programmable gate array type (ASIC/FPGA type) for processing a physical layer of a multiple radio access, and a third digital circuit of microcontroller and digital signal processor for processing a physical layer and higher layers of terrestrial mobile networks, the terminal being wherein the first, second and three circuits are configured to:

emit at a given instant T on a random uplink UL data channel at a predetermined frequency to the access module said one or more bursts of data, including an identifier and information regarding the geographical location of said terminal;

perform the acquisition of a carrier of a downlink DL data channel according to a carrier frequency identifier which was transmitted to the terminal by the access module and start listening for possible bursts transmitted on this DL carrier which are possibly intended for it;

dispatch to the central access module on the random uplink UL communication channel said one or more bursts of data as well as information relating to the location of said terminal at a new instant T+1 wherein the first radiofrequency circuit and the two digital circuits are configured to allow software configuration of RF parameters and of an access and connection protocol which are specific to the space mobile network, the software configuration being carried out by the implementation of all or some of a set of software modules comprising:

a software module for selecting the cellular or mixed, satellite mode of operation, this module being based on a mechanism for detecting the availability of the services and resources of a terrestrial cellular system and/or of a satellite mobile system and in general favoring the use of a terrestrial cellular system;

a software module for parametrizing the software configuration of RF parameters and of an access and connection protocol which are specific to the space mobile network according to operation in the bands allocated to the space mobile service;

a software module for selecting the bandwidth or the number of emission/reception carriers which is suited to the satellite channel;

a module for implementing the method of claim 1, in particular on the up-path with the selection of the timeouts and of the mode of transmission as a function of the type of information to be transmitted and which is suited to the satellite-based communication channel;

a module for implementing a specific power control algorithm suited to the satellite-based communication channel;

a module for implementing a specific Doppler compensation mechanism suited to the satellite-based communication channel.

18. A space telecommunications system comprising:

a multibeam space relay taken from among a satellite and a high-altitude platform station (HAPS) platform; and a ground station, serving as interconnection gateway between a fixed terrestrial infrastructure and the space relay;

an access module for accessing the space network formed by the space relay and the ground station, said access module being embedded on board the space relay when the space relay is regenerative or embedded in the ground station when the space relay is transparent, at least one user space terminal, configured to, in a first step, emit at a given instant T on a random uplink UL data channel and in a predetermined span of frequencies to the space network access module one or more bursts of data predominantly of useful traffic, including an identifier and, when the at least one user space terminal is able to determine or to aid its geo-location, explicit or implicit information regarding the geographical location of said at least one user space terminal;

wherein, the access module is configured to:

in a second step subsequent to the first step, receive and decode the said one or more bursts of data emitted by the at least one user space terminal, associate with the at least one user space terminal a logical beam on the basis of said at least one user space terminal's location information provided in the first step when the at least one user space terminal is able to determine or to aid its geo-location or derived from a received signal carrying said one or more bursts of data emitted when the at least one user space terminal is not able to determine or to aid its geo-location, the associated logical beam wherein the at least one user space terminal lies at the given instant T being a different predetermined fixed geographical area of a set of geographical areas, the set of geographical areas or set of logical beams forming a tiling of a geographical coverage of the multibeam space telecommunications system, and associate in real time with the associated logical beam a plurality of one or more physical emission beams of the space relay which at the given instant T overlap the entirety of said logical beam; and then in a third step, dispatch to the at least one user space terminal, through a broadcasting beacon whose carrier frequency the at least one user space terminal already knows, an identifier of a downlink DL data channel carrier allocated to the at least one user space terminal and to its associated logical beam and to the plurality of the one or more physical emission beam or beams of the space relay which at the given instant T overlap the entirety of and are associated with the logical beam of the terminal, so as to allow the at least one user space terminal to receive and decode useful and control data which are intended for it.

19. The space telecommunications system as claimed in claim 18, wherein the access module is configured to, in the third step, allocate a down-channel DL unique carrier to the logical beam wherein the at least one user space terminal lies, and/or the at least one user space terminal is configured to, in a fourth step executed after the third step, perform the acquisition of the carrier of the downlink DL data channel according to the carrier frequency identifier which was transmitted to it and start listening for possible bursts transmitted on this DL carrier which are possibly intended for it; and then the access module is configured to, in a fifth step subsequent to the fourth step, dispatch to the at least one user space terminal through the downlink DL data channel, at the carrier frequency of the logical beam with which the at least one user space terminal is associated, one or more bursts of data, associated with the logical beam of attachment of the at least one user space terminal, said dispatching being performed on the plurality of the one or more physical emission beam or beams of the space relay which at the given instant T overlap the entirety of and are associated with the logical beam of the at least one user space terminal.

20. The space telecommunications system as claimed in claim 19, wherein the control data relate to the implementation of some or of all of the following mechanisms:
    a mechanism of contention access control on the random uplink UL channel, including congestion control and stream control and taking into account the specifics of a satellite-based or HAPS station-based communication channel, with selection of timeouts and selection of a mode of transmission as a function of the type of data to be transmitted;
    a specific power control mechanism suited to the uplink UL communication channel;
    a Doppler drifts control mechanism;
    an economizer mechanism for saving electrical energy of the at least one user space terminal based on the provision of a temporal duty cycle information item representative of a temporal sharing of one and the same downlink DL data channel carrier frequency by several logical beams served by one and the same satellite.

21. The space telecommunications system as claimed in claim 19, wherein
    the at least one user space terminal is configured to, in a sixth step executed after the fifth step, dispatch to the access module on the random uplink UL communication channel at an up-path carrier frequency said one or more bursts of data as well as information relating to the location of said at least one user space terminal at a new instant T+1; and/or
    the access module is configured to, in a prior step previous to first step, broadcast to the at least one user space terminal which lie in a global geographical coverage of the space relay and on a broadcasting beacon whose carrier frequency the at least one user space terminal already knows, on the one hand the frequency plan of the multibeam space telecommunications system containing a list of identifiers and of respectively associated frequencies of the carriers of uplinks and of downlinks, and optionally information for aiding the location of the at least one user space terminal.

22. The space telecommunications system as claimed in claim 18, wherein
    the logical beam is a simple, compact geographical area in one piece, or
    the logical beam is a finite discrete set of compact elementary geographical areas in one piece, distributed according to spacing distances between neighboring areas that are predetermined.

23. The space telecommunications system as claimed in claim 18, wherein
    the space telecommunications system is a multibeam satellite system comprising a satellite or a constellation of several satellites, the satellite or satellites deploying in geostationary orbits or low orbits or medium orbits.

24. An integrated telecommunications system comprising:
    the space telecommunications system defined according to claim 18; and
    at least one terrestrial system,
    the terrestrial system comprising:
    integrated into one or two terrestrial ground stations, a cellular terrestrial radiofrequency (RF) relay and an interconnection gateway between the terrestrial RF relay and the common fixed terrestrial infrastructure, shared with the multibeam space telecommunications system; and
    an access module for accessing the terrestrial system, formed by the space relay and said one or two terrestrial ground stations, said access module being included in the terrestrial station or one among said one or two terrestrial ground stations, and
    at least one user space terminal of the multibeam space telecommunications system, configured in dual-mode or multi-mode to communicate in the multibeam space telecommunications system and/or the terrestrial system;
    the integrated telecommunications system being wherein:
    the access module is configured to, in a prior step, broadcast to said at least one user space terminal which lie in a global geographical coverage of the space relay on the one hand the frequency plan of the multibeam space telecommunications system containing a list of identifiers and of respectively associated frequencies of the carriers of uplinks and of downlinks;
    said at least one user space terminal is configured to
    in a scan launch and execution step executed after the prior step, scan the broadcasting beacons of the terrestrial system and/or of the multibeam space telecommunications system according to a predetermined scanning algorithm, and provide an indication of a mode of new connection, taken from among connection to the terrestrial system and to the space system, and to be selected, this indication being dependent on the respective availabilities of the terrestrial system and the multibeam space telecommunications system and a selection strategy based on priorities of a system from among the terrestrial system and the multibeam space telecommunications system, and then
    in a validation step, validate the indication of the mode of connection to be selected; thereafter
    in a step of selecting the communication system, connect to the terrestrial system when the terrestrial mode is selected, and connect to the satellite system when the satellite mode is selected, by executing following steps:
        in a first step, the at least one user space terminal emits at a given instant T on a random uplink UL data channel and in a predetermined span of frequencies to the access module one or more bursts of data predominantly of useful traffic, including an identifier and, when the at least one user space terminal is able to determine its geo-location or to aid its geo-location, explicit or implicit information regarding the geographical location of said at least one user space terminal; and then
        in a second step, the access module receives and decodes the one or more bursts of data emitted by the at least one user space terminal, associates with the at least one user space terminal a logical beam on the basis of a location information of the at least one user space terminal provided in the first step when the at least one user space terminal is able to determine its geo-location or to aid its geo-location, or derived from the received signal carrying the one or more bursts of data emitted when the at least one user space terminal is not able to determine or to aid its geo-location, the associated logical beam wherein the at least one user space terminal lies at the given instant T being a different predetermined fixed geographical area of a set of geographical areas, the set of geographical areas or set of logical beams forming a tiling of the geographical coverage of the multibeam space telecommunications system, and associates in real time with the logical beam a plurality of one or more physical emission beams of the space relay which at the given instant T overlap the entirety of said logical beam.

25. A dual-mode or multi-mode telecommunications terminal comprising:
a first radiofrequency (RF) circuit, including an antenna and multi-band RF components,
a second digital circuit of application-specific integrated circuit type or field-programmable gate array type (ASIC/FPGA type) for processing a physical layer of a multiple radio access, and
a third digital circuit of microcontroller and digital signal processor for processing a physical layer and higher layers of terrestrial mobile networks,
the terminal being wherein the first, second and third circuits are configured to:
emit at a given instant T on a random uplink UL data channel at a predetermined frequency to the access module one or more bursts of data, including an identifier and information regarding a geographical location of said terminal;
perform the acquisition of a carrier of a downlink DL data channel according to a carrier frequency identifier which was transmitted to the terminal by the access module and start listening for possible bursts transmitted on this DL carrier which are possibly intended for it;
dispatch to the central access module on the random uplink UL communication channel said one or more bursts of data as well as information relating to the location of said terminal at a new instant T+1.

* * * * *